(12) United States Patent  
Krishnan Gorumkonda et al.

(10) Patent No.: US 11,282,253 B2
(45) Date of Patent: Mar. 22, 2022

(54) MATCHING AUDIO TO A STATE-SPACE MODEL FOR PSEUDORANDOM ANIMATION

(71) Applicant: Snap Inc., Santa Monica, CA (US)

(72) Inventors: Gurunandan Krishnan Gorumkonda, Seattle, WA (US); Shree K. Nayar, New York, NY (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/588,329

(22) Filed: Sep. 30, 2019

(65) Prior Publication Data

US 2021/0097742 A1    Apr. 1, 2021

(51) Int. Cl.
G06T 13/20 (2011.01)
G06T 13/80 (2011.01)
G10L 25/57 (2013.01)

(52) U.S. Cl.
CPC .......... G06T 13/205 (2013.01); G06T 13/80 (2013.01); G10L 25/57 (2013.01)

(58) Field of Classification Search
CPC ........ G06T 13/205; G06T 13/80; G10L 25/57
See application file for complete search history.

(56) References Cited

U.S. PATENT DOCUMENTS

| | | |
|---|---|---|
| 6,285,380 B1 | 9/2001 | Perlin et al. |
| 6,552,729 B1 | 4/2003 | Di Bernardo et al. |
| 6,600,491 B1 | 7/2003 | Szeliski et al. |
| 7,472,910 B1 | 1/2009 | Okada et al. |
| 9,358,456 B1 | 6/2016 | Challinor et al. |
| 9,753,925 B2 | 9/2017 | Cremer et al. |
| 9,827,496 B1 | 11/2017 | Zinno |
| 10,535,174 B1 | 1/2020 | Rigiroli et al. |
| 2003/0179204 A1 | 9/2003 | Mochizuki et al. |
| 2006/0274070 A1 | 12/2006 | Herman et al. |
| 2010/0082345 A1 | 4/2010 | Wang et al. |

(Continued)

FOREIGN PATENT DOCUMENTS

| | | |
|---|---|---|
| DE | 102012111304 A1 | 5/2014 |
| WO | WO-2008087621 A1 | 7/2008 |

OTHER PUBLICATIONS

"U.S. Appl. No. 16/588,373, Non Final Office Action dated Sep. 15, 2020", 19 pgs.

(Continued)

*Primary Examiner* — Yanna Wu
(74) *Attorney, Agent, or Firm* — Schwegman Lundberg & Woessner, P.A.

(57) ABSTRACT

Methods, devices, media, and other embodiments are described for generating pseudorandom animations matched to audio data on a device. In one embodiment a video is generated and output on a display of the device using a computer animation model. Audio is detected from a microphone of the device, and the audio data is processed to determine a set of audio characteristics for the audio data received at the microphone of the device. A first motion state is randomly selected from the plurality of motion states, one or more motion values of the first motion state are generated using the set of audio characteristics, and the video is updated using the one or more motion values with the computer animation model to create an animated action within the video.

20 Claims, 28 Drawing Sheets

(56) References Cited

U.S. PATENT DOCUMENTS

| | | | |
|---|---|---|---|
| 2011/0293144 A1* | 12/2011 | Rahardja | A63F 13/10 |
| | | | 382/103 |
| 2012/0086855 A1 | 4/2012 | Xu et al. | |
| 2012/0130717 A1* | 5/2012 | Xu | H04L 51/10 |
| | | | 704/258 |
| 2012/0143358 A1 | 6/2012 | Adams et al. | |
| 2013/0069957 A1 | 3/2013 | Xie et al. | |
| 2017/0206697 A1 | 7/2017 | Mckenzie et al. | |
| 2017/0285918 A1 | 10/2017 | Shah et al. | |
| 2019/0026932 A1 | 1/2019 | Kishi et al. | |
| 2019/0043239 A1 | 2/2019 | Goel et al. | |
| 2021/0312682 A1 | 10/2021 | Krishnan Gorumkonda et al. | |
| 2021/0312690 A1 | 10/2021 | Krishnan Gorumkonda et al. | |

OTHER PUBLICATIONS

"U.S. Appl. No. 16/588,373, Response filed Oct. 12, 2020 to Non Final Office Action dated Sep. 15, 2020", 10 pgs.

"U.S. Appl. No. 16/588,373, Final Office Action dated Oct. 23, 2020", 26 pgs.

U.S. Appl. No. 16/588,446, filed Sep. 30, 2019, Automated Dance Animation.

U.S. Appl. No. 16/588,412, filed Sep. 30, 2019, State-Space System for Pseudorandom Animation.

U.S. Appl. No. 16/588,373, filed Sep. 30, 2019, Management of Pseudorandom Animation System.

"U.S. Appl. No. 16/588,373, Advisory Action dated Dec. 16, 2020", 5 pgs.

"U.S. Appl. No. 16/588,373, Response filed Dec. 8, 2020 to Final Office Action dated Oct. 23, 2020", 10 pgs.

"International Application Serial No. PCT/US2020/070586, Invitation to Pay Additional Fees dated Dec. 11, 2020", 13 pgs.

"U.S. Appl. No. 16/588,373, Notice of Allowance dated Mar. 22, 2021", 11 pgs.

"U.S. Appl. No. 16/588,412, Final Office Action dated May 17, 2021", 31 pgs.

"U.S. Appl. No. 16/588,412, Non Final Office Action dated Mar. 17, 2021", 30 pgs.

"U.S. Appl. No. 16/588,412, Response filed Apr. 19, 2021 to Non Final Office Action dated Mar. 17, 2021", 12 pgs.

"U.S. Appl. No. 16/588,446, Non Final Office Action dated Mar. 24, 2021", 20 pgs.

"Forward Kinematics", Wikipedia, <https://en.wikipedia.org/wiki/Forward_kinematics>, wayback machine on Nov. 15, 2018, (2018), 4 pgs.

"International Application Serial No. PCT/US2020/070586, International Search Report dated Mar. 9, 2021", 7 pgs.

"International Application Serial No. PCT/US2020/070586, Written Opinion dated Mar. 9, 2021", 10 pgs.

"U.S. Appl. No. 16/588,373, Corrected Notice of Allowability dated Jun. 16, 2021", 2 pgs.

"U.S. Appl. No. 16/588,446, Notice of Allowance dated Jul. 14, 2021", 9 pgs.

"U.S. Appl. No. 16/588,446, Response filed Jun. 24, 2021 to Non Final Office Action dated Mar. 24, 2021", 10 pgs.

"Tempi for iPhone/iPad/Mac—Improve your rhythm and tempo.", [Online]. Retrieved from the Internet: <https://madebywindmill.com/tempi/>, (2020), 3 pgs.

Bock, Sebastian, et al., "Accurate Tempo Estimation based on Recurrent Neural Networks and Resonating Comb Filters", Proceedings of the 16th ISMIR Conference, Malaga, Span, (2015), 625-631.

Ellis, Daniel P.W., "Beat Tracking by Dynamic Programming", Journal of New Music Research, 36:1, 51-60, DOI: 10.1080/09298210701653344, (2007), 21 pgs.

"U.S. Appl. No. 16/588,446, Supplemental Notice of Allowability dated Jul. 26, 2021", 2 pgs.

"U.S. Appl. No. 16/588,373, Notice of Allowance dated Aug. 25, 2021", 11 pgs.

"U.S. Appl. No. 16/588,412, Response filed Sep. 17, 2021 to Final Office Action dated May 17, 2021", 12 pgs.

"U.S. Appl. No. 16/588,412, Notice of Allowance dated Oct. 4, 2021", 10 pgs.

"U.S. Appl. No. 16/588,373, Corrected Notice of Allowability dated Oct. 27, 2021", 2 pgs.

\* cited by examiner

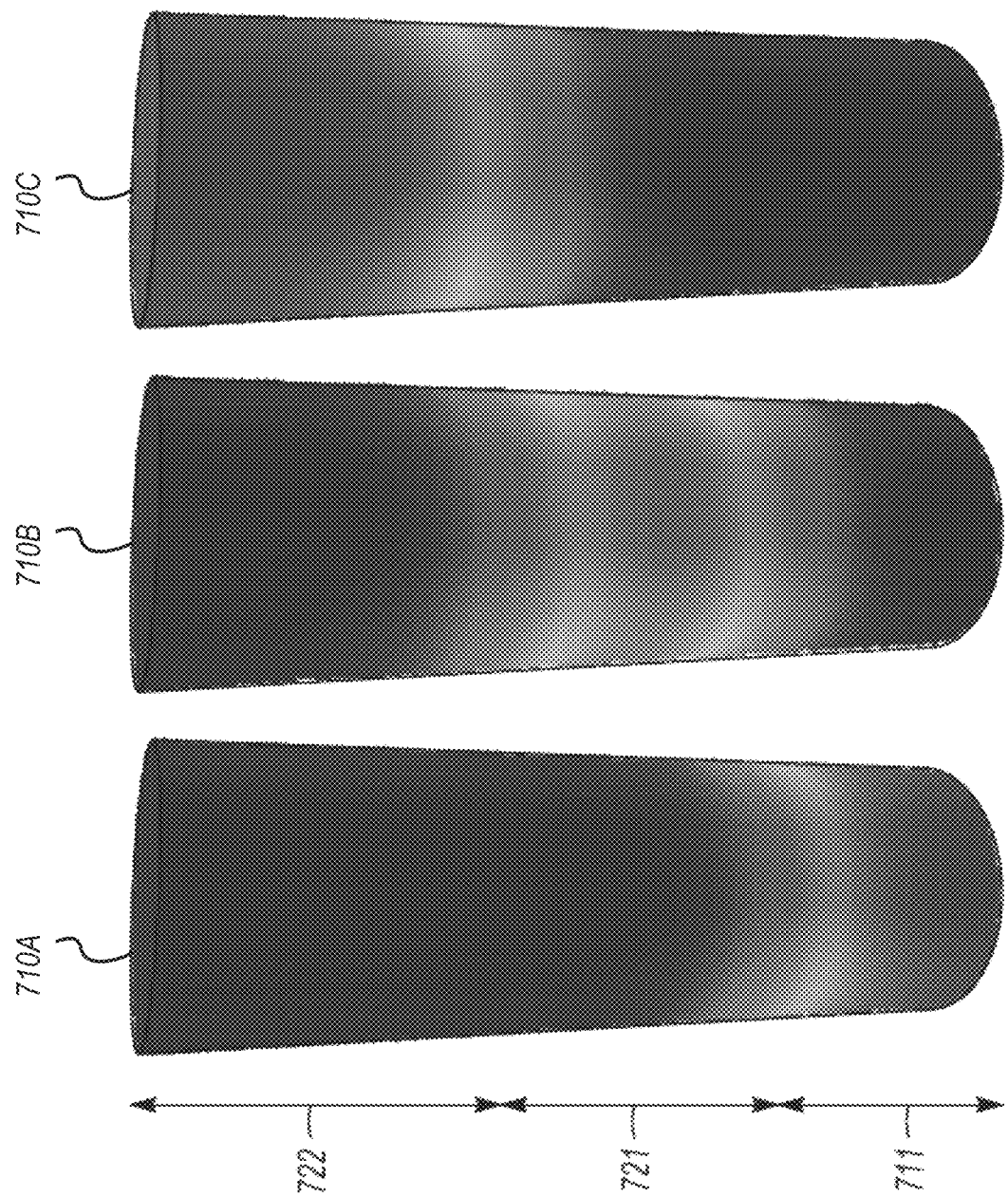

MATCHING AUDIO TO A STATE-SPACE MODEL FOR PSEUDORANDOM ANIMATION

TECHNICAL FIELD

Embodiments of the present disclosure relate generally to computer animation and graphical user interfaces (GUI), including the generation and use of animation structures within a messaging system with access to audio data.

BACKGROUND

Computer animation involves adding movement to structures within a computer model that are output on a display of a device. Augmented reality is the display of the physical world and/or physical objects therein with an overlay of computer-generated perceptual information (e.g. animated computer models). The overlaid information may be constructive (adding to the display) and/or destructive (masking of the display). In either case, the computer-generated perceptual information can be animated to modify the information presented on a display of a device.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 7B illustrates aspects of a computer model that can be used as part of a system for generating and displaying animations in accordance with some embodiments.

DETAILED DESCRIPTION

Figure 1:
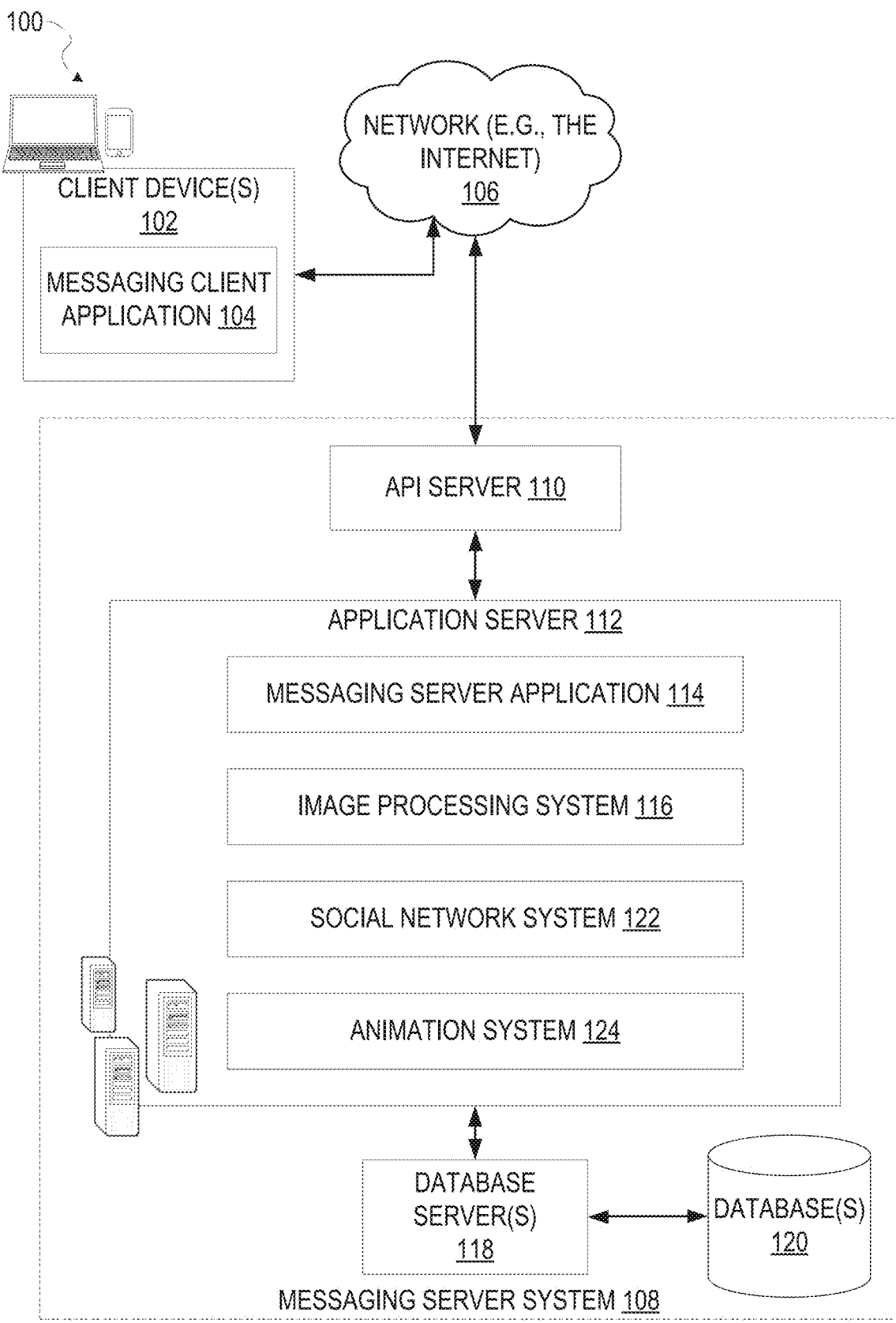
FIG. 1 is a block diagram showing an example messaging system for exchanging data (e.g., messages and associated content) over a network, which can include models and data for animation in accordance with some embodiments.

Systems, methods, user interfaces, instructions stored in media, computing devices, and other various embodiments associated with configuring and generating animations are described. Certain embodiments particularly include structures for identifying a state-space of possible animations for a certain model. The state-space for a model can be described by possible motions of independent control points within the model, as well as animation speeds for each action and each control point. Each element of the state-space can have a probability assigned to configure pseudorandom animations with the probabilities of certain motions being configurable. Additionally, some embodiments include matching aspects of the pseudorandom animations to audio signals, as well as audio thresholds for initiating animations, and systems for matching the pseudorandom motions of a computer model to characteristics of an audio signal.

For example, a designer can use an animation or overlay creation tool to generate a model of a penguin having certain control points in the model. A designer can select certain motions of the control points that map to certain audio characteristics as determined by the designer while maintaining an element of randomness to the motions of the animated model. The control points can have possible motions assigned to describe all possible movements of all parts of the model. A designer can then assign a probability to each motion, so that during a displayed animation, the likelihood of certain motions occurring are set probabilistically by the designer. Motions which the designer does not want to occur are assigned a probability of zero, or are removed from the state-space. In addition to selection of motions for each control point, a display speed can be selected as a harmonic of an audio tempo to allow the pseudorandom motions to be matched automatically to a tempo of music. In other embodiments, other characteristics can be set as part of a state-space for a model. When the computer animation is operating on a device, the designer's selections of probabilities for the model's state space influence the animation motions of the model. By matching actions to a tempo of an audio stream, the computer model operating on a device can display an animation with random elements that are matched to audio data on or around the device. This can create a "dancing" animation that includes randomness selected from a large pool of possible motions, but with the motions filtered by a designer from all possible motions to emphasize motions that illustrate characteristics selected by a designer.

In addition to of the pseudorandom animations that can be matched to audio, various characteristics can be used as thresholds on when certain animations are to be performed. For example, certain beat elements can be used to trigger a particular set of probabilities, and a different beat element or the absence of a distinct beat can be used to select a default animation or a different set of probabilities for the state-space of all possible motions for a model.

Such systems can be integrated with a messaging system to automatically analyze message data to apply a model to image data that is part of a system message. A recipient of such a message can then display the image with the pseudorandom motion applied to a model within the message. Audio data detected at the recipient's device can influence the displayed animation. For example, an image of a sender's face can be sent with a model applied to cause animation of parts of a face in the image, such as hair, ears, eyebrows, eyes, etc. The animation as displayed at the recipient's device will use the probabilities applied by the designer, and audio at the recipient's device to create the actual animation output at the recipient's device. Other examples can use three dimensional models applied to images, or overlays applied to an image which manipulate or add augmented reality animations to images in a message. Examples of various such embodiments are described in detail below.

FIG. 1 is a block diagram showing an example messaging system 100 for exchanging data (e.g., messages and associated content, including data for modifying images with animations or creating animations from models) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

In accordance with embodiments described herein, client devices 102 can implement systems for generating pseudorandom animations that are synchronized to audio data received at the client device 102 using an application such as messaging client application 104. Data for the systems can be managed by animation system 124 of application server 112. Part of the management performed by application server 112 can be accepting data created by a designer for a particular animation as image modification data (e.g. overlays, image transformations, LENSES, and such to be implemented with model animation within the messaging system, and managing the availability of such image modification data.)

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data including image modification data used to implement pseudorandom animations as described herein).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically more resource efficient to initially deploy certain technology and functionality within the messaging server system 108, but to later migrate this technology and functionality to the messaging client application 104 where a client device 102 has sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an application program interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the application program interface (API) server 110, this server receives and transmits message data (e.g., commands and message payloads) between the client device 102 and the application server 112. Specifically, the application program interface (API) server 110 provides a set of interfaces (e.g., routines and protocols) that can be called or queried by the messaging client application 104 in order to invoke functionality of the application server 112. The application program interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104). In some embodiments, aspects of a system for generating pseudorandom animations and synchronizing the animations to audio data can be accessed through such an API server 100.

The application server 112 hosts a number of applications and subsystems, including a messaging server application 114, an image processing system 116, a social network system 122, and an animation system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories, galleries, or collections). These collections are then made available, by the messaging server application 114, to the messaging client application 104. Other processor and memory intensive processing of data may also be performed server-side by the messaging server application 114, in view of the hardware resources for such processing.

The application server 112 also includes an image processing system 116 that is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

The database 120 also stores image modification data, which can include computer models for implementing animations as described herein. In some embodiments, such image modification data can be used to implement LENSES or other such transformations or AR images.

As described above, LENSES, overlays, image transformations, AR images and similar terms refer to modifications that may be made to videos or images. This includes real-time modification which modifies an image as it is captured using a device sensor and then displayed on a screen of the device with the modifications. This also includes modifications to stored content, such as video clips in a gallery that may be modified. For example, in a device with access to multiple LENSES, a user can use a single video clip with multiple LENSES to see how the different LENSES will modify the stored clip. For example, multiple LENSES that apply different pseudorandom movement models can be applied to the same content by selecting different LENSES for the content. Similarly, real-time video capture may be used with an illustrated modification to show how video images currently being captured by sensors of a device would modify the captured data. Such data may simply be displayed on the screen and not stored in memory, or the content captured by the device sensors may be recorded and stored in memory with or without the modifications (or both). In some systems, a preview feature can show how different LENSES will look within different windows in a display at the same time. This can, for example, enable multiple windows with different pseudorandom animations to be viewed on a display at the same time.

Data and various systems to use LENSES or other such transform systems to modify content using this data can thus involve detection of objects (e.g. faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a three-dimensional mesh model of the object or objects, and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g. images or frames of video). Lens data thus refers both to the images, models, and textures used to create transformations in content, as well as to additional modeling and analysis information needed to achieve such transformations with object detection, tracking, and placement.

Real time video processing can be performed with any kind of video data, (e.g. video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some embodiments, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g. using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve: changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some embodiments of a computer animation model to transform image data using face detection, the face is detected on an image with use of a specific face detection algorithm (e.g. Viola-Jones). Then, an Active Shape Model (ASM) algorithm is applied to the face region of an image to detect facial feature reference points.

In other embodiments, other methods and algorithms suitable for face detection can be used. For example, in some embodiments, features are located using a landmark which represents a distinguishable point present in most of the images under consideration. For facial landmarks, for example, the location of the left eye pupil may be used. In an initial landmark is not identifiable (e.g. if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Embodiments of a transformation system can capture an image or video stream on a client device and perform complex image manipulations locally on a client device such as client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on a client device.

In some example embodiments, a computer animation model to transform image data can be used by a system where a user may capture an image or video stream of the user (e.g., a selfie) using a client device 102 having a neural network operating as part of a messaging application 104 operating on the client device 102. The transform system operating within the messaging application 104 determines the presence of a face within the image or video stream and provides modification icons associated with a computer animation model to transform image data, or the computer animation model can be present as associated with an interface described herein. The modification icons include changes which may be the basis for modifying the user's face within the image or video stream as part of the modification operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some embodiments, the graphical user interface, presenting the modification performed by the transform system, may supply the user with additional interaction options. Such options may be based on the interface used to initiate the content capture and selection of a particular computer animation model (e.g. initiation from a content creator user interface). In various embodiments, a modification may be persistent after an initial selection of a modification icon. The user may toggle the modification on or off by tapping or otherwise selecting the face being modified by the transformation system. and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified or such modifications may be individually toggled by tapping or selecting the individual face or a series of individual faces displayed within the graphical user interface.

In various embodiments described herein, any of the modifications described above can be integrated with systems to generate models, or with models that have state-space options associated with audio data matching (e.g. speed harmonic values for setting animation speeds in conjunction with tempo values from detected audio data). In other embodiments, such modifications included with LENSES or any other such overlays changes to content can be integrated in various different ways with the systems for pseudorandom animation described herein.

Figure 2:
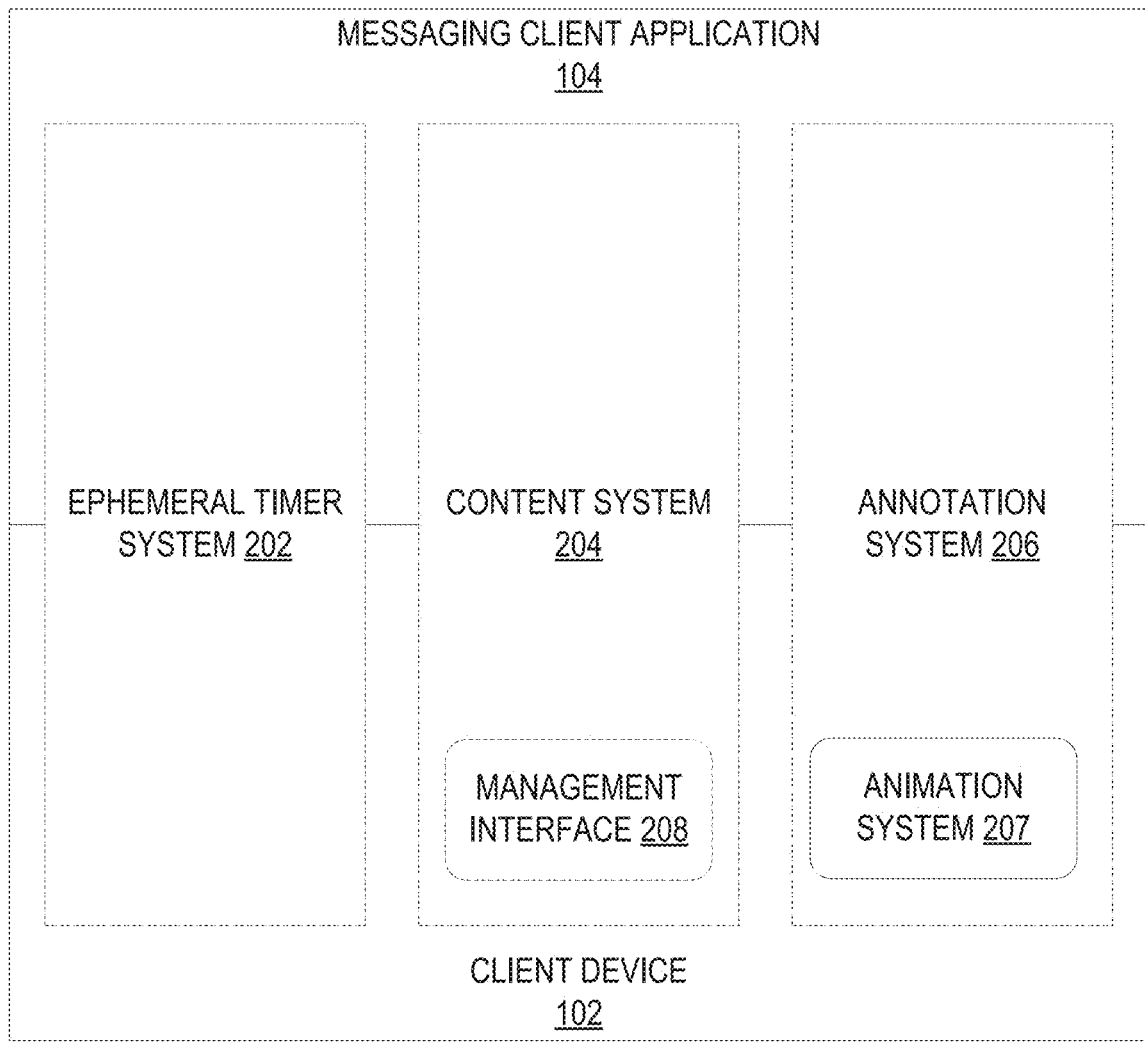
FIG. 2 is block diagram illustrating further details regarding a messaging system with elements for creating and implementing animations according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

Annotation system 206 includes animation system 207 that can be used to implement some or all aspects of a system for pseudorandom animation as described herein as part of a messaging client application 104 on a client device 102. In other embodiments, such a system can be split with different portions operating on client device 102 and a server system.

Content system 204 can be used to store content (e.g. images and video) that can be used to animation models to generate pseudorandom animations as described herein. In some systems, such content can be real time content (e.g. for AR content) or stored (e.g. for gallery previously captured content). If a user is generating a message, management interface 208 can be used to select previously configured modification information (e.g. an image transformation or AR modification) for inclusion in a message. If a user is designing modification information (e.g. by selecting animation probabilities, designing an animation model, or selecting other such options such as when creating LENSES, AR modifications or other such overlays or image and video transformations) management interface 208 can be used for such systems in a designer device.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages, or graphical element, selectively display and enable access to messages and associated content via the messaging client application 104. This can, in some embodiments, limit access to a particular configuration of a pseudorandom animation as described herein.

The collection management system 204 is responsible for managing collections of media (e.g., a media collection that includes collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

In some embodiments, a management interface 208 of a collection management system 204 furthermore includes interface options that allows a collection manager to manage and curate a particular collection of content. For example, the management interface 208 enables an event organizer to curate a collection of content relating to a specific event (e.g., delete inappropriate content or redundant messages) in such systems. Additionally, the collection management system 204 can employ machine vision (or image recognition technology) and content rules to automatically curate a content collection. In certain embodiments, compensation may be paid to a user for inclusion of user generated content (e.g. a particular model with associated pseudorandom animation elements) into a collection. In such cases, the management interface 208 operates to automatically make payments to such users for the use of their content.

Figure 3:
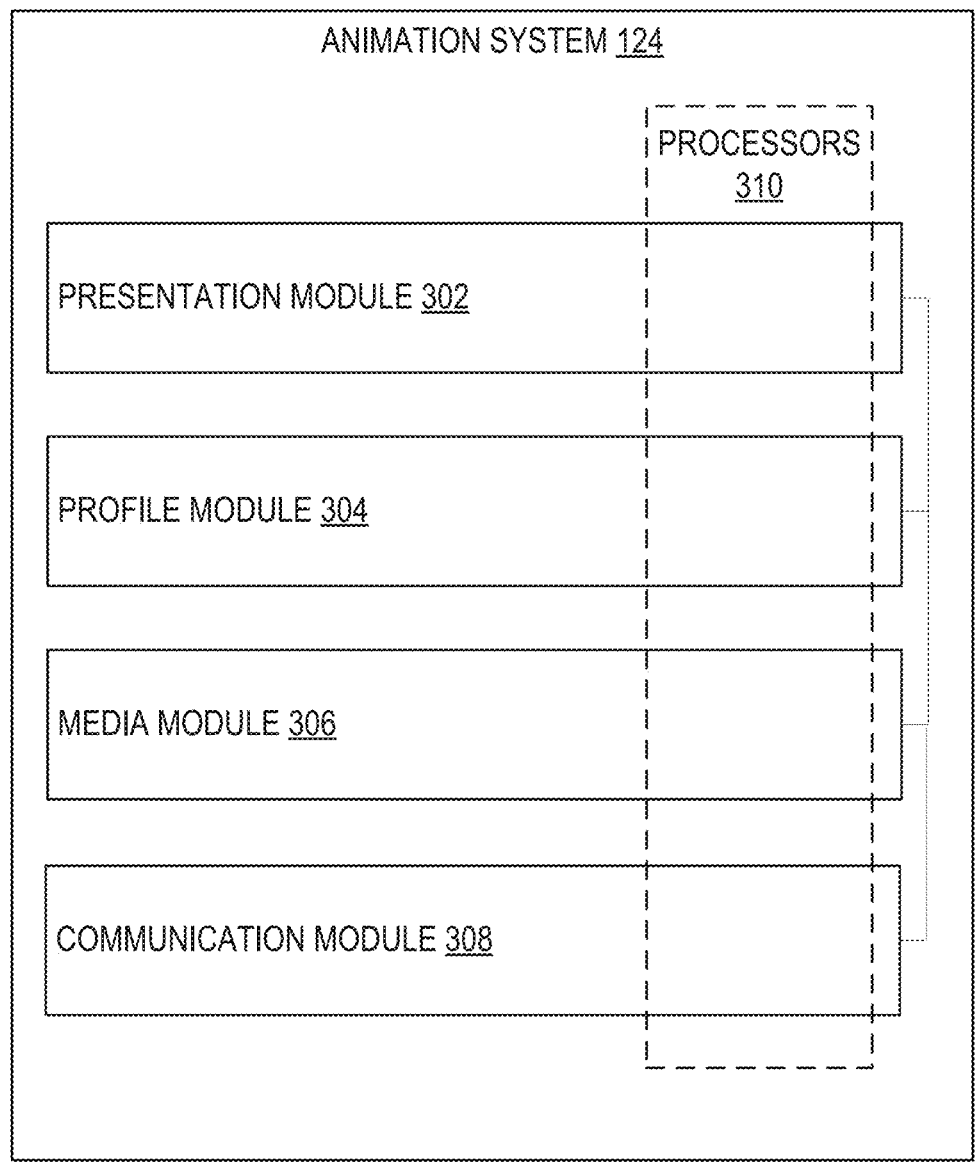
FIG. 3 is block diagram illustrating further details regarding a messaging system with elements for creating and implementing animations according to example embodiments.

FIG. 3 is a block diagram illustrating components of the messaging system 100 which enable the system to perform operations that include communicating content modified with systems for pseudorandom animation and associated modification data between accounts. The animation system 124 is shown as including a presentation module 302, a user profile module 304, a media module 306, and a communication module 308, all configured to communicate with each other (e.g., via a bus, shared memory, or a switch). Any one or more of these modules may be implemented using one or more processors 310 (e.g., by configuring such one or more processors 310 to perform functions described for that module) and hence may include one or more of the processors 310. While these modules are described in the context of an animation system to enable pseudorandom animation in a messaging system, such elements may be integrated with larger profile and data management systems within various embodiments.

Any one or more of the modules described may be implemented using hardware alone (e.g., one or more of the processors 310 of a machine) or a combination of hardware and software. For example, any module described of the animation system 124 may physically include an arrangement of one or more of the processors 310 (e.g., a subset of or among the one or more processors of the machine) configured to perform the operations described herein for that module. As another example, any module of the animation system 124 may include software, hardware, or both, that configure an arrangement of one or more processors 310 (e.g., among the one or more processors of the machine) to perform the operations described herein for that module. Accordingly, different modules of the animation system 124 may include and configure different arrangements of such processors 310 or a single arrangement of such processors 310 at different points in time. Moreover, any two or more modules of the animation system 124 may be combined into a single module, and the functions described herein for a single module may be subdivided among multiple modules. Furthermore, according to various example embodiments, modules described herein as being implemented within a single machine, database 120, or device may be distributed across multiple machines, databases 120, or devices.

Figure 4A:
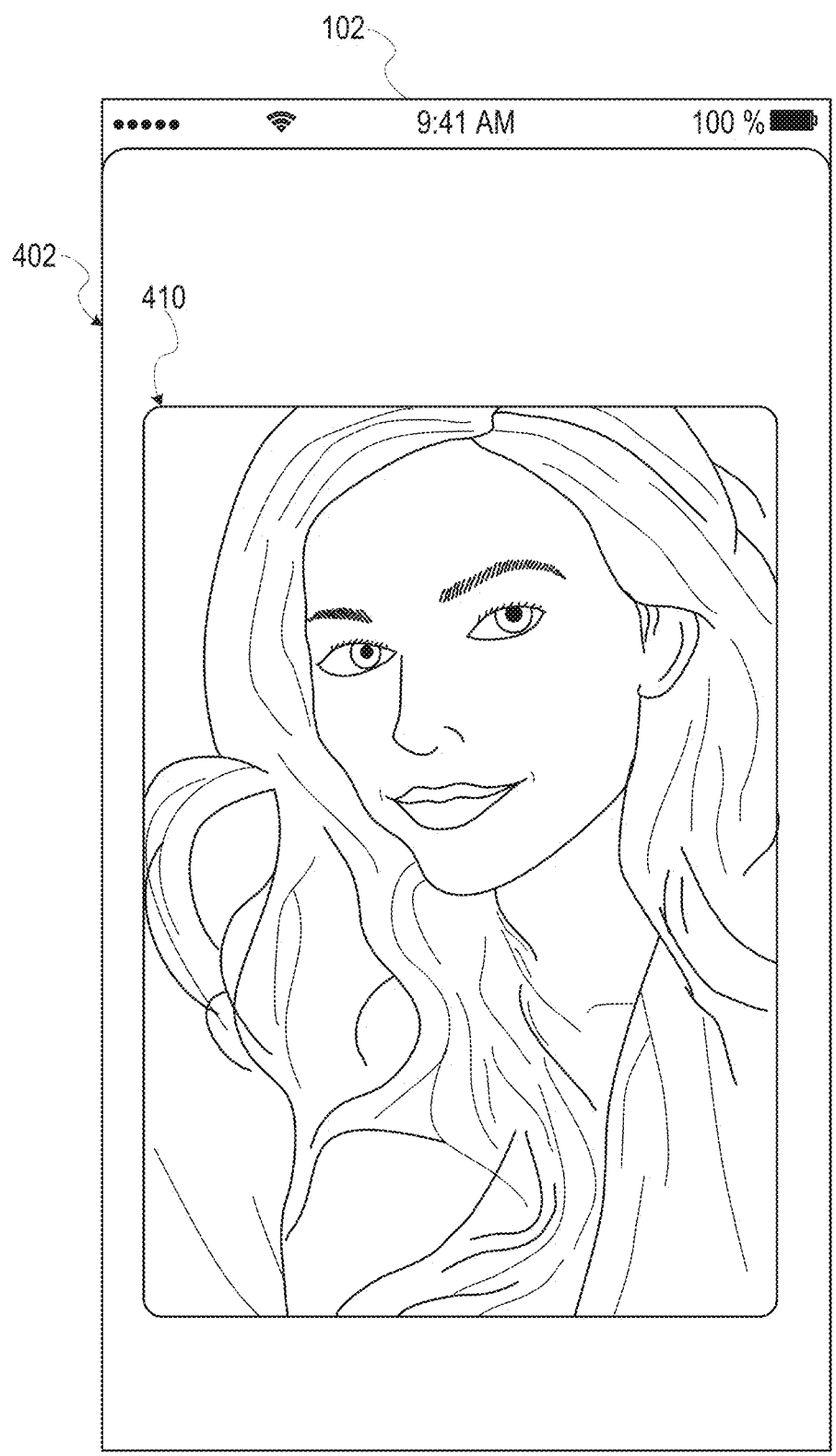
FIG. 4A is an interface diagram depicting aspects of a display and image data that can be animated according to certain example embodiments.

The various modules within an animation system 124 or other management systems of a messaging system 100 such as the system using messaging server system 108 may operate in a variety of ways to improve device performance by managing system communications and interfaces as described herein. The state-space structures as part of pseudorandom animation enable processing and memory resources to produce complex animations more efficiently than other systems that simply predetermine such complex animations or use other resource intensive options to generate such animations. In some systems in accordance with the embodiments described herein, the use of structures for pseudorandom animation is both outside of the standard structure for a messaging system 100, and a driver of system use, and so systems that improve performance by reducing interface operations, particularly for creator accounts, while also providing increased creator control and options for creator attribution improve the overall system performance. The various modules and systems described above and below thus enable systems to implement complex pseudorandom animations in a message system with resource constrained user devices that implement the animations FIGS. 4A-4E then illustrate aspects of a system for displaying a pseudorandom animation. As described above and illustrated in FIG. 4A, a user's client device 102 can be used to display images such as image 410 in a display 402 of client device 102. When an embodiment for pseudorandom animation is configured on a client device 102, a computer animation model is applied to the image data to enable the pseudorandom animation.

Figure 4B:
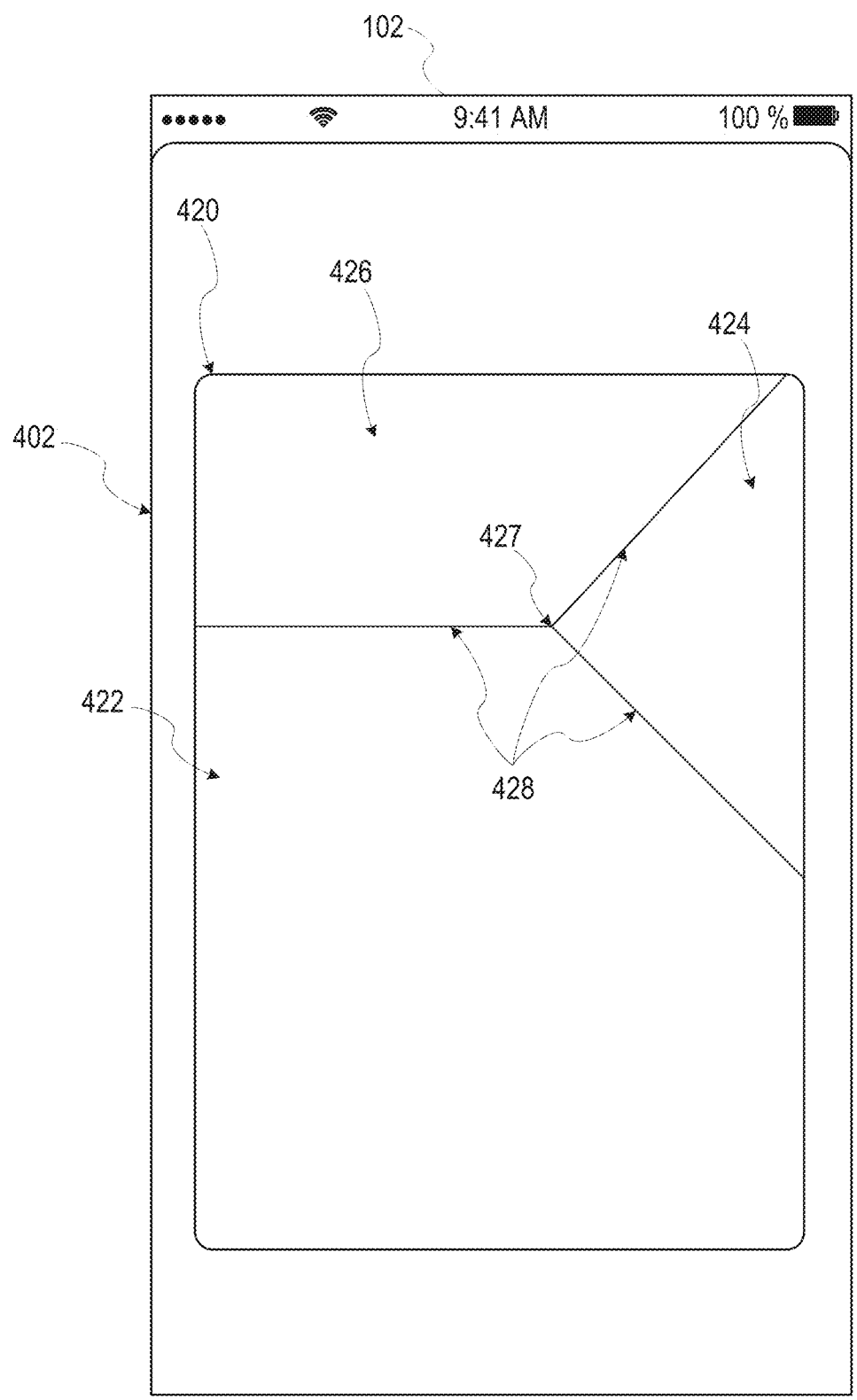
FIG. 4B illustrates a device display with aspects of an overlay that can be implemented to generate an animation in accordance with some embodiments.

FIG. 4B illustrates aspects of one potential computer animation model, that takes image data and fragments the data into multiple frames, with an animation applied to intersections of the frames. FIG. 4B includes animation area 420 in display 402 of client device 102. The animation area includes three frame animation areas 422, 424, and 426, with boundaries 428. These three frames are part of the computer animation model that is used with image 410 data to generate a pseudorandom animation using the computer animation model and image 410. The computer animation model includes a control point 427 that can have a motion pattern and a motion speed applied to create a pseudorandom animation with image 410.

Figure 4C:
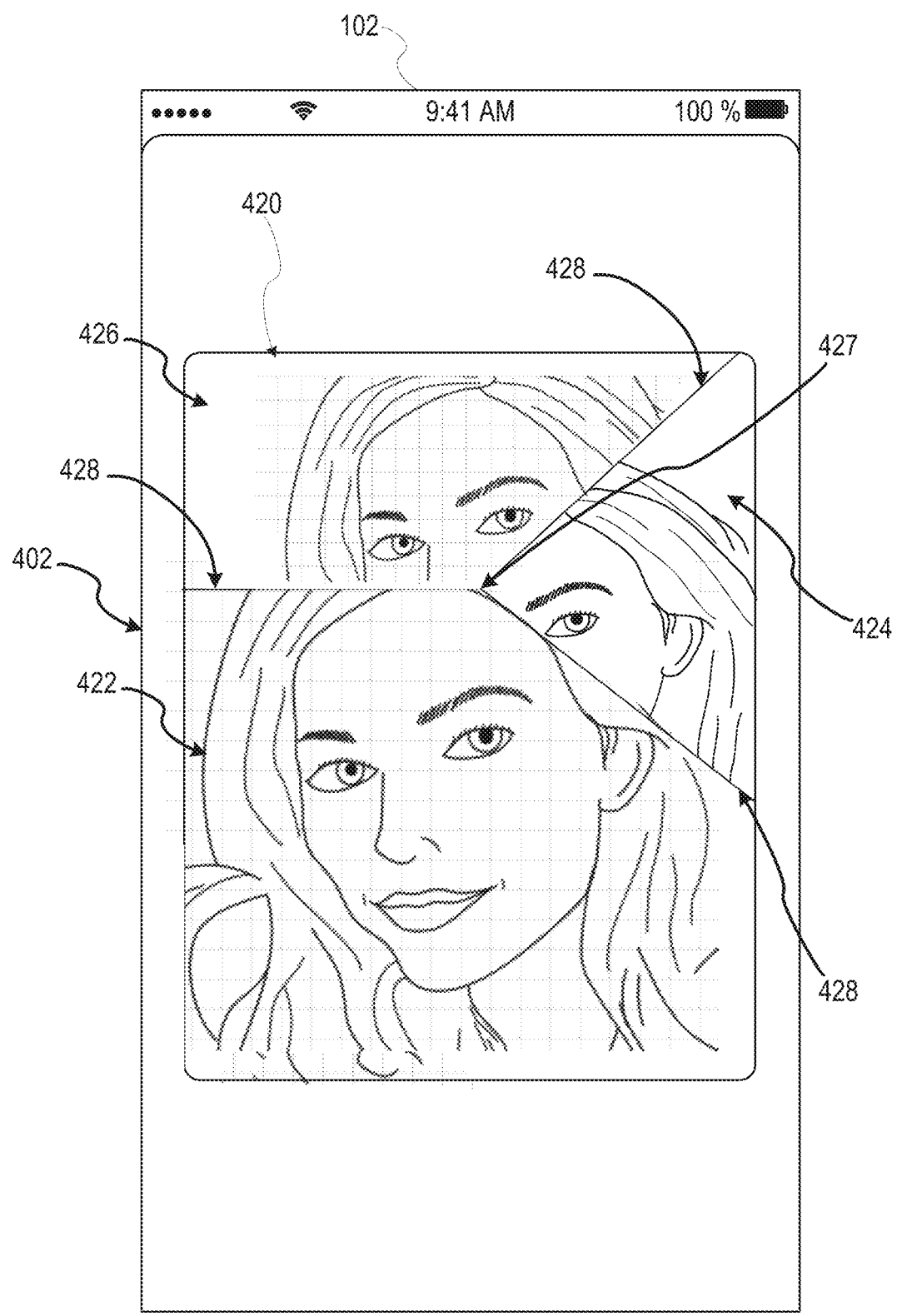
FIG. 4C illustrates aspects of a system for generating and displaying animations in accordance with some embodiments.

FIG. 4C then further illustrates this animation. As illustrated in FIG. 4C, portions of image 410 are placed in frames 422, 424, and 426. As control point 427 is moved, the frame boundaries are configured to follow the movement of control point 427. For example, as control point moves up and down, the boundaries 428 can move within display area 420 while maintaining a relative position to control point 427 and clipping the edges at the intersection with display area 420. The portions of image 410 within each frame 422, 424, 426 can either be configured to match the movement of control point 427, or to stay stationary and adjust the displayed portion of the image within each frame. Limitations on movement of control point 427 to generate the pseudorandom animation are discussed in more detail below.

Figure 4D:
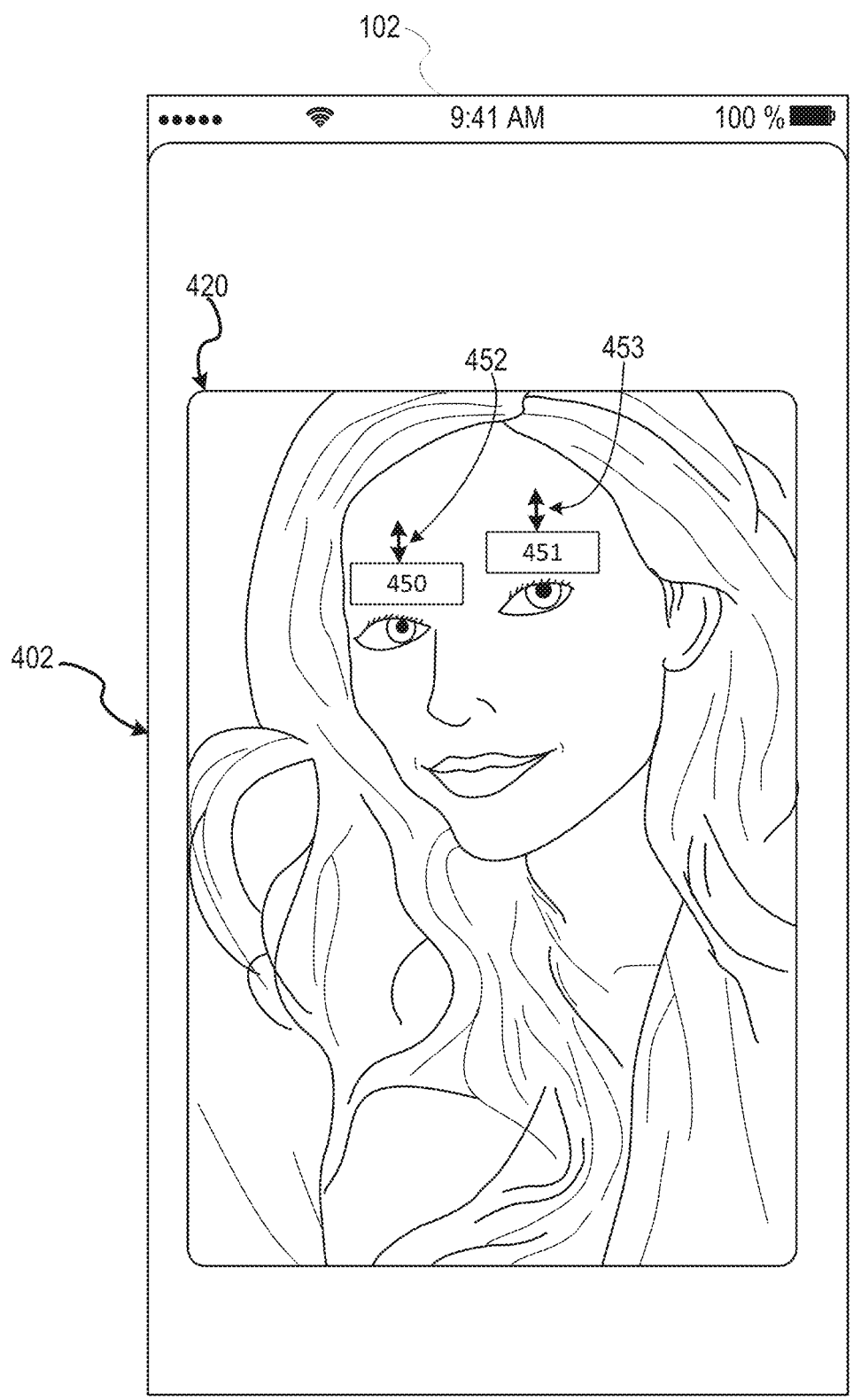
FIG. 4D illustrates aspects of a system for generating and displaying animations in accordance with some embodiments.
Figure 4E:
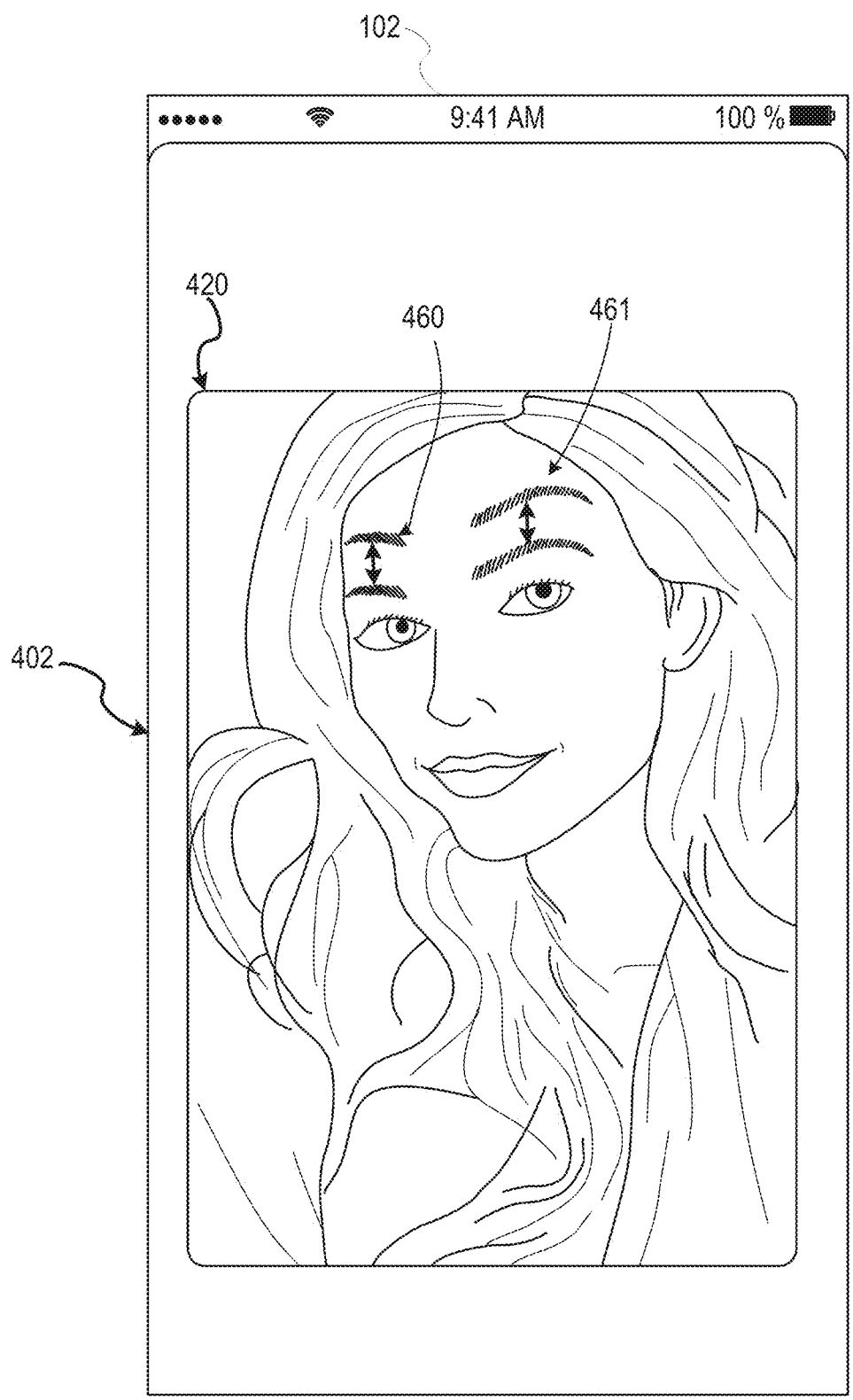
FIG. 4E illustrates aspects of a system for generating and displaying animations in accordance with some embodiments.

While FIGS. 4B and 4C illustrate a geometric overlay computer animation model with a single control point, FIGS. 4D and 4E illustrate an image modification computer animation model. In FIG. 4D, a computer animation model identifies eyebrow areas 450 and 451 within image 410, as well as a range of motion 452 and 453 for each eyebrow area 450, 451. When the pseudorandom animation is implemented, the image 410 is displayed with the eyebrow areas 450, 451 modified to generate an animation on display 402 within display area 420. During the video output of the animation, the eyebrow areas are treated as control points in the computer model, and can be moved as shown by movements 460, 461 of FIG. 4E which are each associated with control points of a computer animation model.

FIGS. 4A-E thus illustrate examples of applying a computer animation model to image data in accordance with embodiments described herein. In FIGS. 4B and 4C, the visible output of the model is the geometric shape which adjusts the boundaries 428 around the frames using control point 427. In FIGS. 4D and 4E, the visible output of the model is the movement of eyebrow images as part of a motion image, with the eyebrow areas used as control point. While these two examples illustrate computer animation models in accordance with embodiments described herein, it will be apparent that many other examples are possible. For example, any portion of a face or a body can be selected as a control point and animated. In some embodiments, an entire body can be animated. In one example, a fully body image can be used to generate a two-dimensional "puppet" from the image, with interconnected parts having control points with movements limited by the connections between the parts, and movements for each control point set as described below. Further, other objects besides faces and bodies can be animated. An image of a tree can be analyzed to identify control points within the trunk and at branches, and used to animate movement of the tree. An image of a chair can similarly be animated using control points.

Further still, in addition to animating objects within an image as illustrated by FIGS. 4D and 4E, any type of overlay can be animated. For example, while FIGS. 4B and 4C show a frame boundary animation, in some embodiments, any type of overlay can be used as a computer animation model. For example, a computer model for fireworks can be structured as a simple overlay, with areas for display of fireworks selected within a display area 410 of a display 402. The control points can either be considered fixed areas within a display area 410, or can be assigned independently to animations as they are presented within a display area 410. The display speed and motion of the animations can then be controlled for pseudorandom animation within the defined areas of the computer animation model for the fireworks as set by a designer of the particular model.

It will therefore be apparent that a designer of such animation can select control points in a wide variety of models in order to apply the pseudorandom animations described herein to generate a wide variety of types of video animations. As described above, such animations can be generated using a management interface (e.g. a computer animation model designer tool) or any such applications as part of generating models for use with pseudorandom animations in a messaging system or in any system as described herein.

Figure 5A:
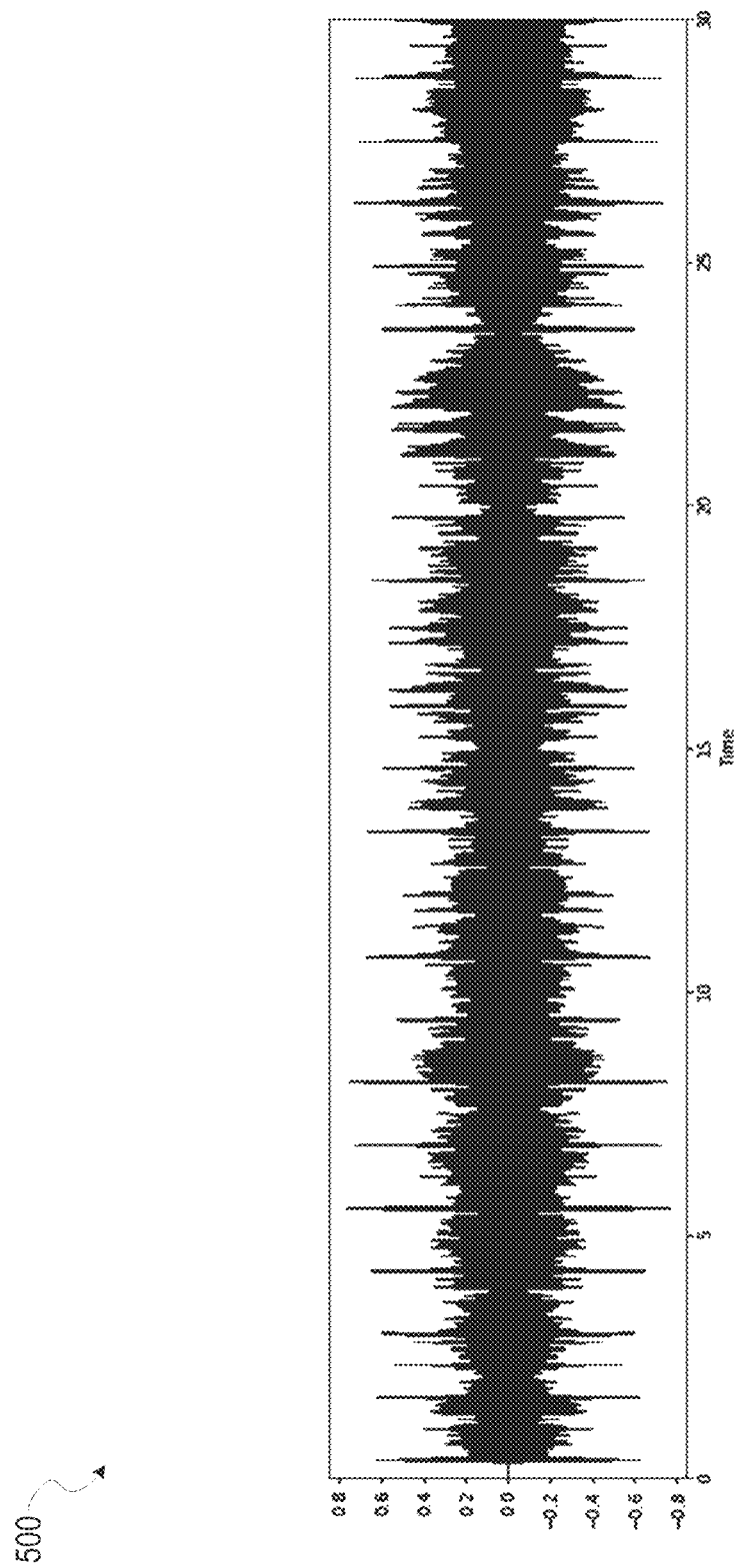
FIG. 5A illustrates aspects of audio data which can be used with a system for generating and displaying animations in accordance with some embodiments.
Figure 5B:
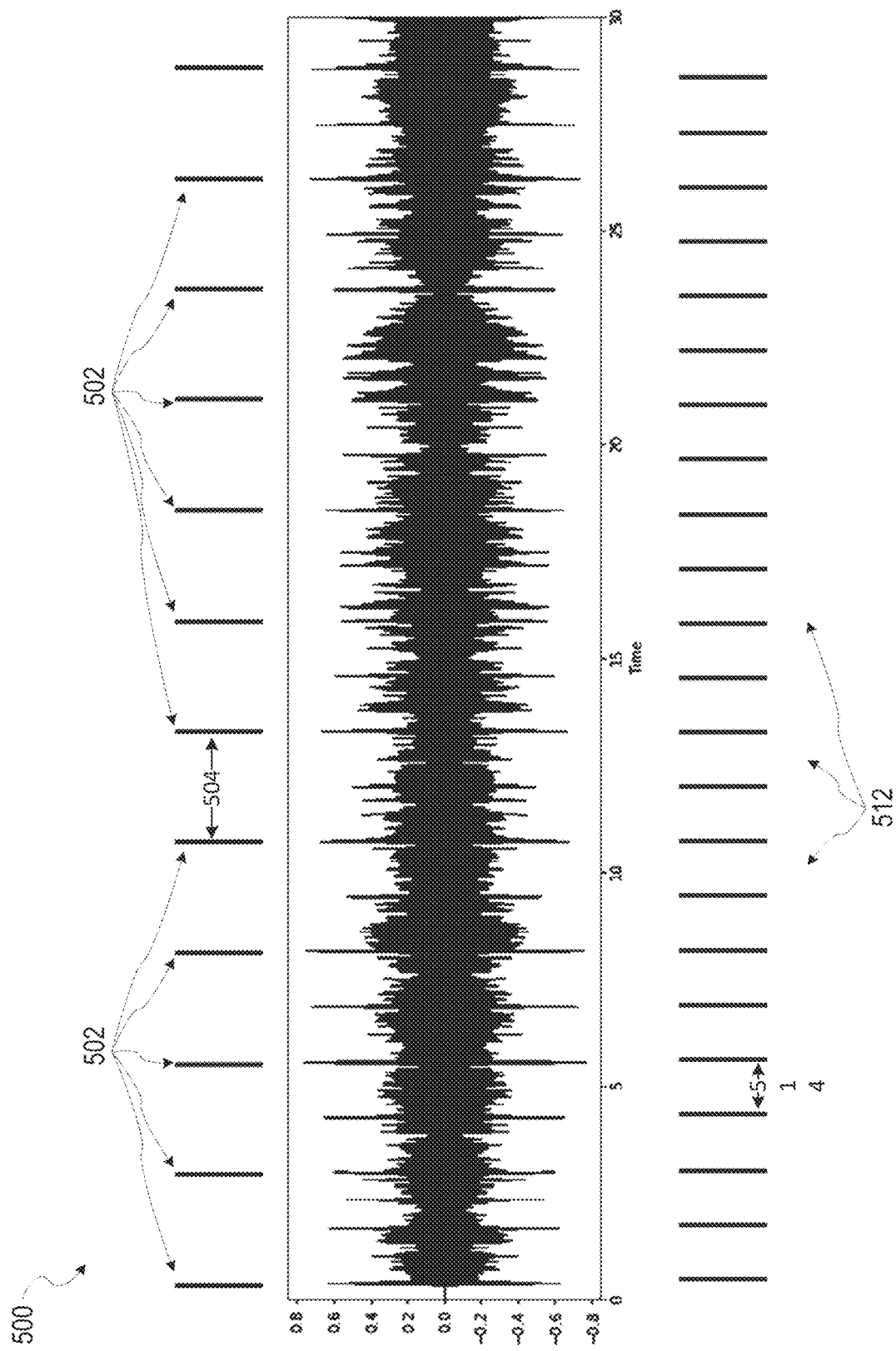
FIG. 5B illustrates aspects of audio data which can be used with a system for generating and displaying animations in accordance with some embodiments.

FIGS. 5A and 5B then illustrate aspects of audio data that can be used for aspects of the pseudorandom animation described herein. FIGS. 5A and 5B illustrate aspects of audio data 500 which can be used with a system for generating and displaying animations in accordance with some embodiments. The audio data 500 of shows an amplitude over time for a particular set of audio inputs. While audio data 500 is illustrated as time based amplitude information, such information can be received at a client device 102 and analyzed for various audio characteristics. As shown in FIG. 5B the particular audio data 500 can be analyzed for audio characteristics including identification of a tempo 504 from beats 502, and a harmonic 514 that can be associated with other pattern data 512 within the audio data. The audio stream can be from a microphone of the client device 102, or can be from a file or other memory of the device. The tempo of audio data is a basic audio characteristic that can be identified as part of a set of audio data from analyzing a stream of audio data at a device such as a client device 102. In addition to identifying beats within the audio data and a tempo associated with a portion of the audio data (e.g. beats per time period for a section of the audio data), other audio characteristics can be identified. Such audio characteristics can include, but are not limited to melody analysis, harmony analysis, frequency content of the music, consistency of beats, varying "voices" or expected contributors to the audio, or other direct details of the sounds, frequencies, and changes within the audio data. Additionally, indirect characteristics of the audio data can be assigned audio characteristics, such as an "energy" of the audio data, a "danceability" of the audio data, changes and transitions in any identified characteristic, pauses or transitions between repeated audio characteristics, matches to known or audio patterns, or any such characteristics. As a device analyses a stream of audio data, values can be assigned to any such characteristics, and the values can be updated over time as the audio stream continues. For example, an audio stream can simply contain voices, and be assigned a tempo value of 0. As a piece of music is played, analysis of the audio data stream can identify that a repeated beat is detected, and adjust the tempo value to match the detected beat repetitions within the audio stream. As additional characteristics or changes in characteristics of the audio data are identified by device processors, values for those characteristics can be assigned or updated.

Figure 6A:
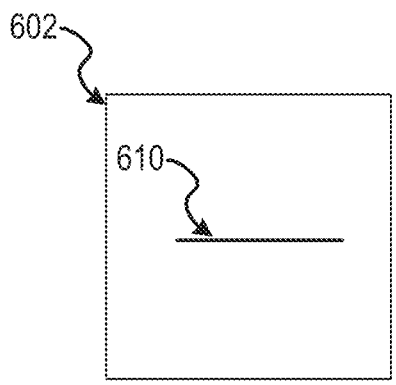
FIG. 6A illustrates aspects of motion patterns that can be used as part of an animation state-space in accordance with some embodiments.
Figure 6A:
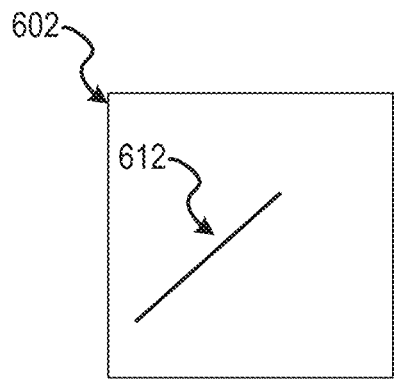
Figure 6A:
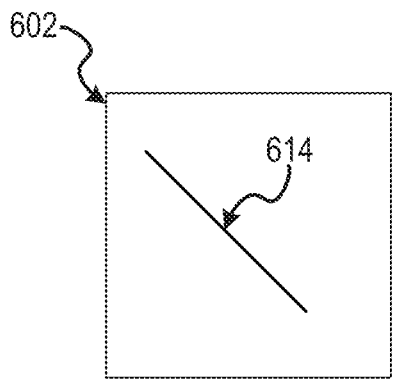
Figure 6A:
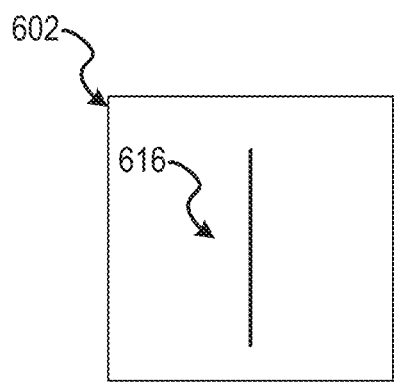
Figure 6A:
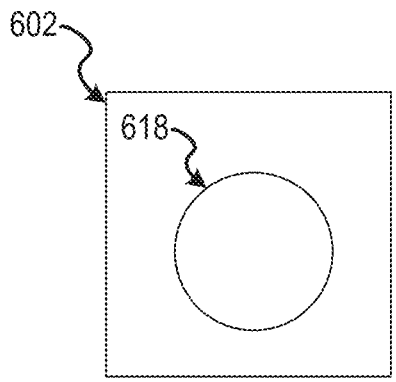
Figure 6A:
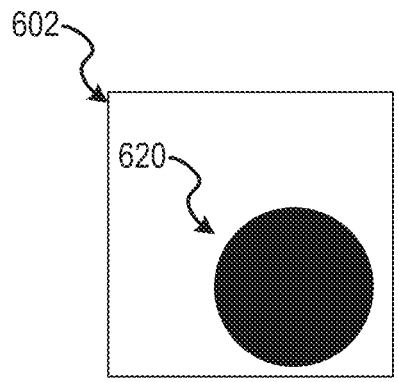

FIG. 6A illustrates aspects of motion patterns 600 that can be used as part of an animation state-space in accordance with some embodiments. In FIG. 6A, six example motion patterns 610, 612, 614, 616, 618, and 620 are illustrated. Each motion pattern is shown in a movement space 602 for an example control point. For example, if motion pattern 618 is selected, the control point that motion pattern 618 is selected for will move in a circular pattern as shown. If motion pattern 616 is selected, the control point will move back and forth linearly in a single direction as shown. Motion patterns 610-618 are intended to show simple motion patterns along a fixed path. Other motion patterns with more complex characteristics are also possible. For example, with motion pattern 620, a particular path is not described, but motions are possible anywhere within the circular shape, but prohibited outside the circular shape in areas that are still possible within the constraints of the acceptable motions for the control point defined by movement space 602.

The use of selected motion patterns 620 within the movement space 602 of all possible motions allows for an organized configuration of selected movements to be matched to audio data, as well as suppression of specific unwanted movements. Simple motion pattern templates can be created and managed in large numbers while still allowing a designer to design a pseudorandom animation from a large state-space without overwhelming the designer with selection options or exceeding the capabilities of processing resources. Depending on the actual processing resources available or anticipated by a designer, the state-space size can be adjusted easily be limiting the number of motion patterns associated with a particular computer model or implementation of a computer model. For example, a template system can have access to any number of motion patterns, or a designer can create any number of motion patterns (e.g. thousands, tens of thousands, etc.). When implementing a particular computer animation model, the data for motion patterns can be filtered so that only data associated with selected (e.g. non-zero probability motion patterns) are included for communication as part of a particular communication. In simpler systems with limited numbers of motion patterns, data for all motion patterns can be communicated, including data for motion patterns set with a zero probability in order to simplify and standardize communications for certain types of animations.

In accordance with embodiments described herein, then, a computer animation model will have a motion state space that is based on a number of control points in the model, a number of motion patterns available for each control point, and a number of animation speeds available for each model at each control point.

Figure 6B:
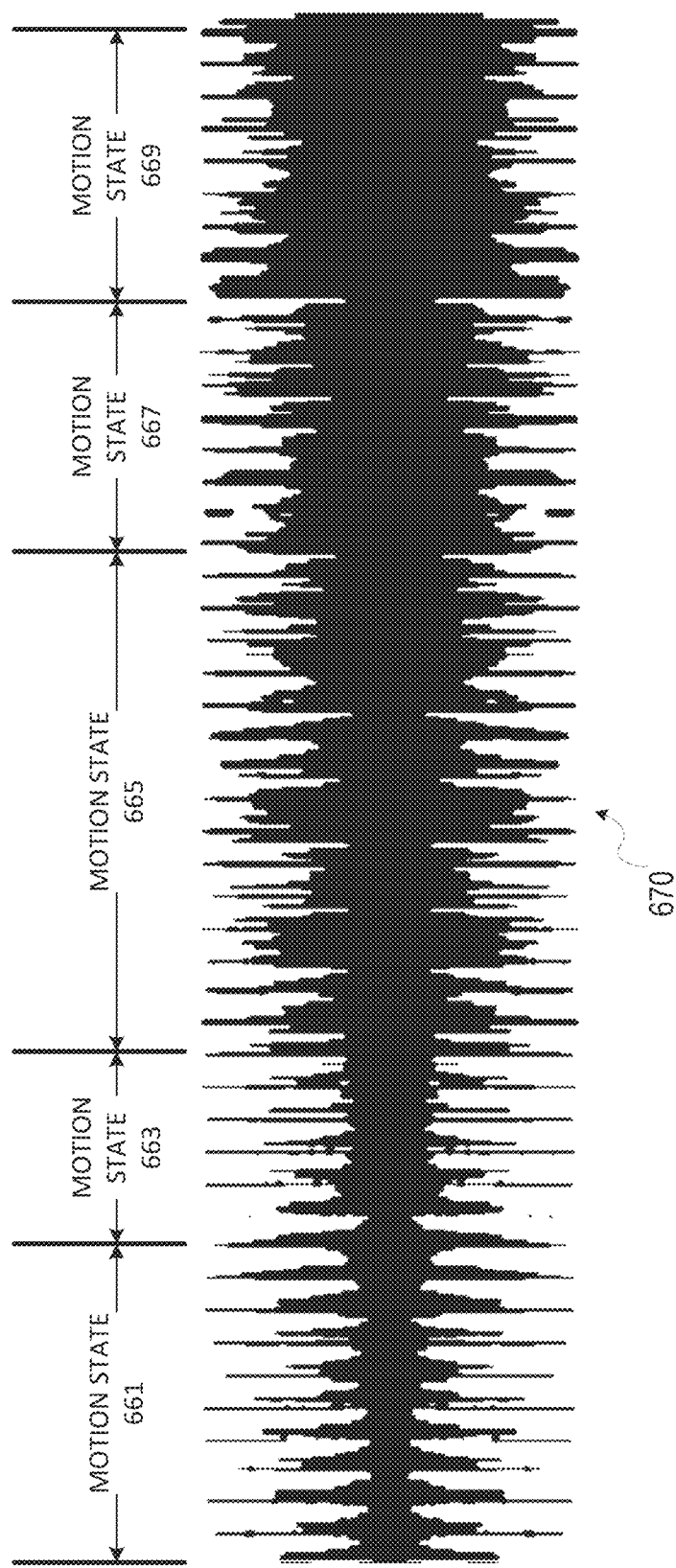
FIG. 6B illustrates aspects of a system for generating and displaying animations in accordance with some embodiments.

For example, if motion patterns 600 are all possible motion patterns for control point 427 with equal probability assigned to each motion pattern, then when an animation is generated, the associated computer model will be used to generate an output video with the boundaries 428 moving in conjunction with control point 427 with the motion from motion patterns 600 assigned to control point 427 at a given time. The motion assigned for a given time can change based on the probability assigned for a given motion state and a motion pattern of a particular motion state. FIG. 6B illustrates this, as over time, the motion states 661, 663, 665, 667, and 669 for a computer animation model 650 change as the computer animation model is used to generate an output video animation synchronized to audio data 670.

As described herein, an animation is assigned a motion state for a given time or time period. The motion state is selected from the state-space of all possible motion states for the computer animation model. Different computer animation models can have different frameworks (e.g. combinations of variables or data structures) for the associated state-space of the model. In one example embodiment, an animation framework associated with a computer animation model comprises A control points (e.g. control point 527 or control points associated with eyebrow areas 450, 451), B motion patterns (e.g. motion patterns 610-620), and C tempo harmonics (e.g. harmonic multiples of tempo 504 determined from beats 502) such that a number of motion states N for the computer animation model within the animation framework is:

$$N=(B \times C)^A \quad (1)$$

Further, as part of the framework, each of the N motion states M are assigned a probability, such that a probability mass function P( ) of the probability values assigned to said each motion state is:

$$P(M_1, M_2, M_3 \ldots M_{N-1}, M_N)=1. \quad (2)$$

When the computer animation model having values assigned to each element of the state-space, the particular motion state used at any given time is selected based on the probability for each motion state.

In one simple example using the figures above, a framework for a computer animation model can have two control points (e.g. the model of FIGS. 4D and 4E) and six motion patterns (e.g. motion patterns 610, 612, 614, 616, 618, and 620). Additionally, the template can have four harmonic speeds (e.g. 1×, 0.5×, 2×, and 4×). Each harmonic speed is a multiple of a tempo that is determined by audio data that is used in conjunction with an output animation generated using a computer animation model. In this example, the state-space for the computer animation model includes 576 motion states (e.g. $(6 \times 4)^2$ motion states). Each motion state can have a different assigned probability value, so that certain motion states occur more frequently than other motion states. For example, a motion state for the above model in which both control points (e.g. eyebrow areas) use motion pattern 616 at a tempo harmonic equal to the tempo of the music can be set to occur 95% of the time, with the remaining motion states assigned equal probabilities of occurring during the other 5% of the time. The transitions between motion states (e.g. a selection or reselection of a motion state) can occur at fixed periods, or randomly. In other embodiments, any possible triggers or periods for transitioning between motion states can be used, including identifying thresholds or transitions in audio characteristics as described below.

Figure 6C:
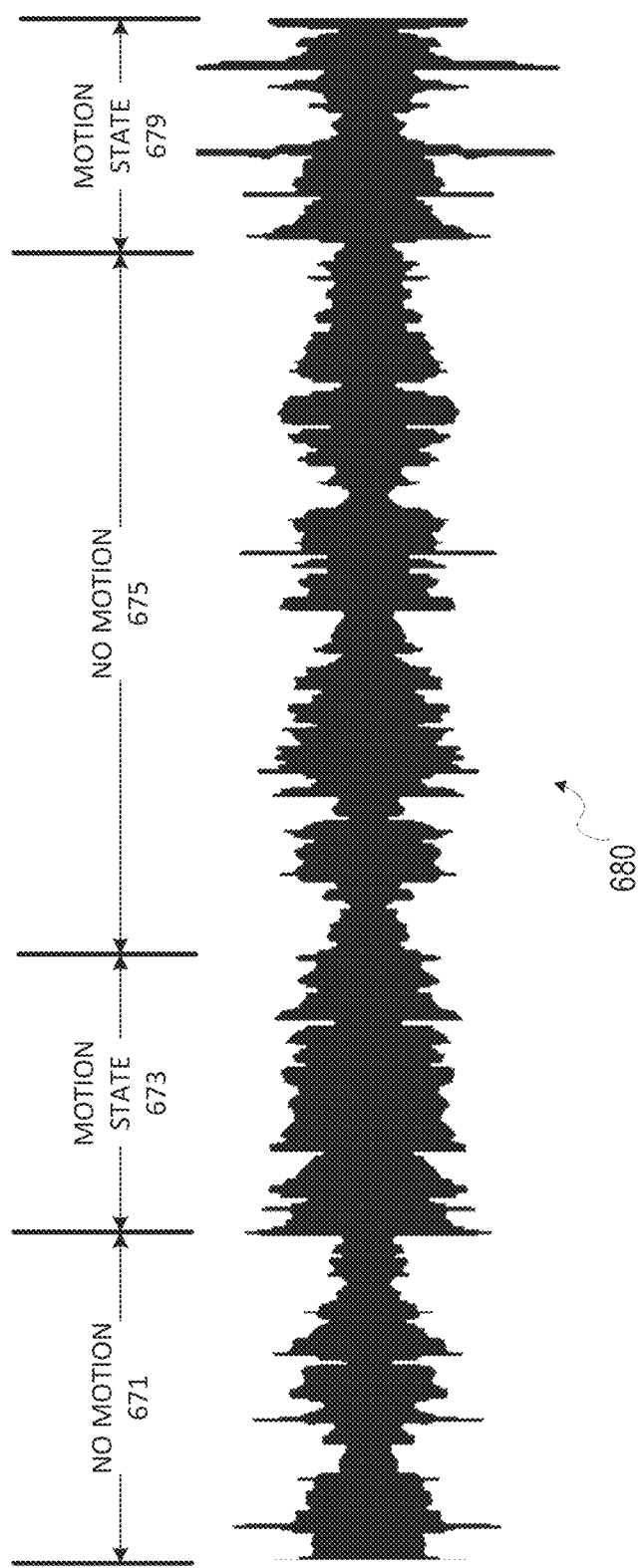
FIG. 6C illustrates aspects of a system for generating and displaying animations in accordance with some embodiments.

As described above, various audio characteristics can be determined from audio data. In one example, an audio energy value or a "danceability" value is determined for a segment of audio data, and this can be used as a threshold to determine whether to generate a pseudorandom animation matched to the audio data. Audio data 680 of FIG. 6C, for example, can be determined to have a tempo similar to a tempo of audio data 670 of FIG. 6B. However, the additional details (e.g. frequency content, beat strength, beat consistency, etc.) can be used to determine additional characteristics, that can be specific to a framework or particular computer animation model and definable by a designer. In the example of FIG. 6C, audio data 680 does not meet a threshold for animation during time periods associated with no motion states 671 and 675, but meets the threshold criteria for motion during the time period for motion states 673 and 679. As described above, motion state 673 and motion state 679 can be selected randomly from the state-space for the computer animation model being executed based on the assigned probability for all motion states, including selected motion state 673 and selected motion state 679 during the time periods when those motion states are used to generate a video animation. In some embodiments, during no motion state 671, the computer animation model is frozen, and does not move at all in the video frame. In other embodiments, a default or "waiting" animation can be used, that transitions to a selected motion state when an audio data threshold is met. Such embodiments may use a transition animation between such states, or can move directly between the states. Similarly, in various embodiments described herein, the randomly selected motion states can have transition animations used as the computer model transitions between the motion states, or can simply animate movements based on a current motion state as new motion states are selected.

Figure 7A:
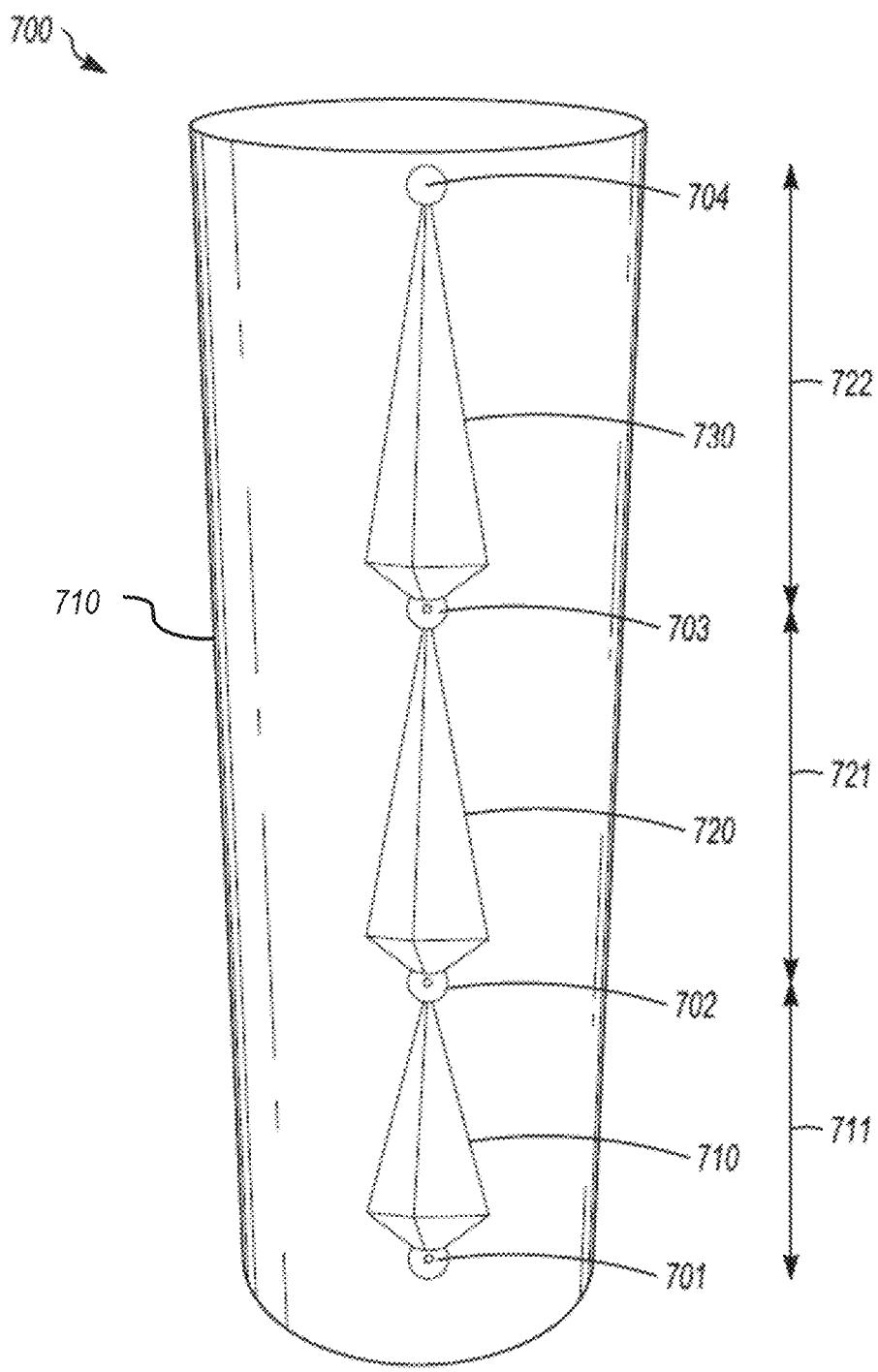
FIG. 7A illustrates aspects of a computer model that can be used as part of a system for generating and displaying animations in accordance with some embodiments.

FIG. 7A illustrates aspects of a computer model that can be used as part of a system for generating and displaying animations in accordance with some embodiments. In the example details discussed above of computer animation models in FIG. 4, two dimensional computer animation models are described. While complex models are possible in two dimensions as described above (e.g. two dimensional puppets of persons or objects, multi-transition models such as a firework model with firework motion objects appearing and disappearing, etc.), some embodiments use three dimensional computer animation models.

FIG. 7A illustrates a simple computer animation model 700 having three bones 730, 720, and 710, a skin 710 around the bones, joints or connection points 701, 702, 703, and 704. Each bone 710, 720, 730 has a control point, which can be a connection point or any other such point directly on the bone. In one embodiments, connection point 701 is stationary, connection point 702 is a control point for bone 710, connection point 703 is a control point for bone 720, and connection point 704 is a control point for bone 730. Relative movements of the skin in areas 711, 721, and 722 are primarily, but not exclusively, impacted modified by motion patterns associated with single control points, such that first area 711 is primarily impacted by joint 702, second area 721 is primarily impacted by joint 703, and third area 722 is primarily impacted by joint 704, with the joints directed to follow a motion pattern defined within the state space for the computer animation model 700. Aspects of this impact on the skin 701 are illustrated in FIG. 7B by skins 710A, 710B, and 710C.

Figure 7C:
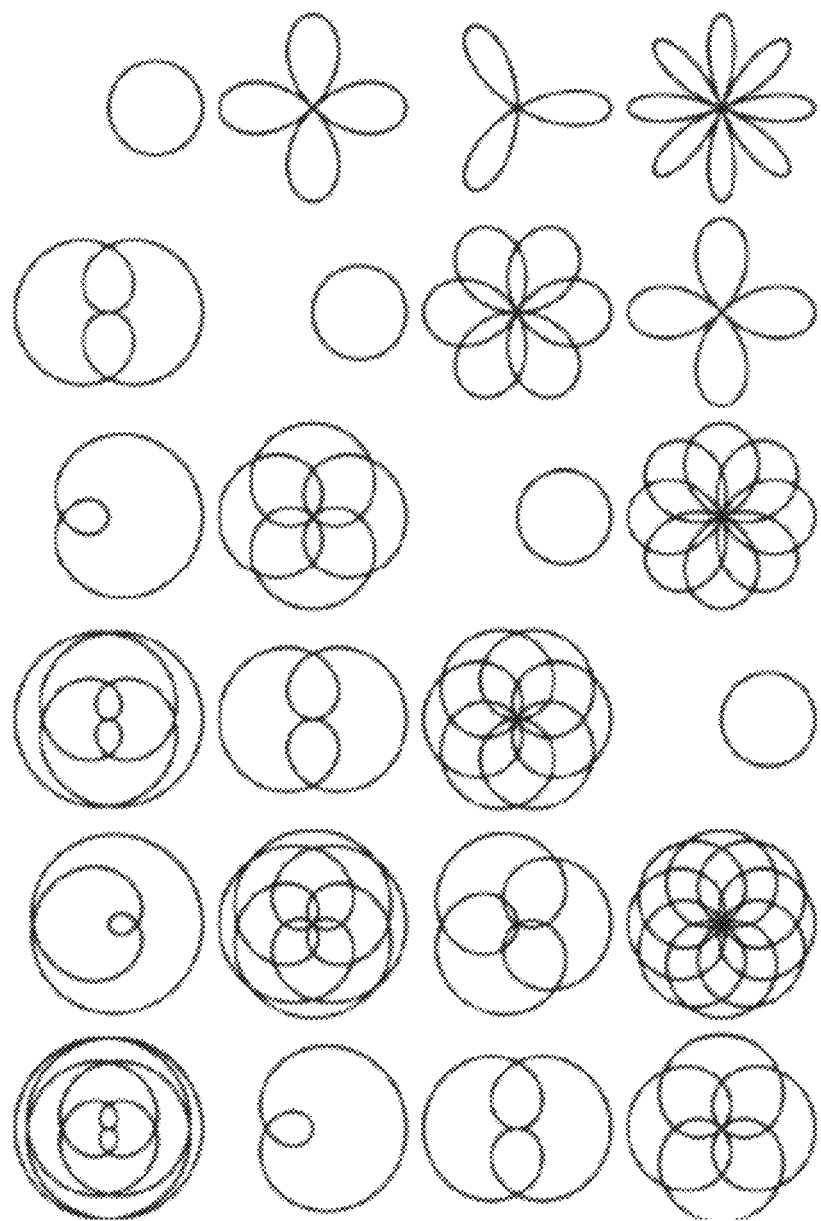
FIG. 7C illustrates aspects of motion patterns that can be used as part of an animation state-space in accordance with some embodiments.
Figure 7D:
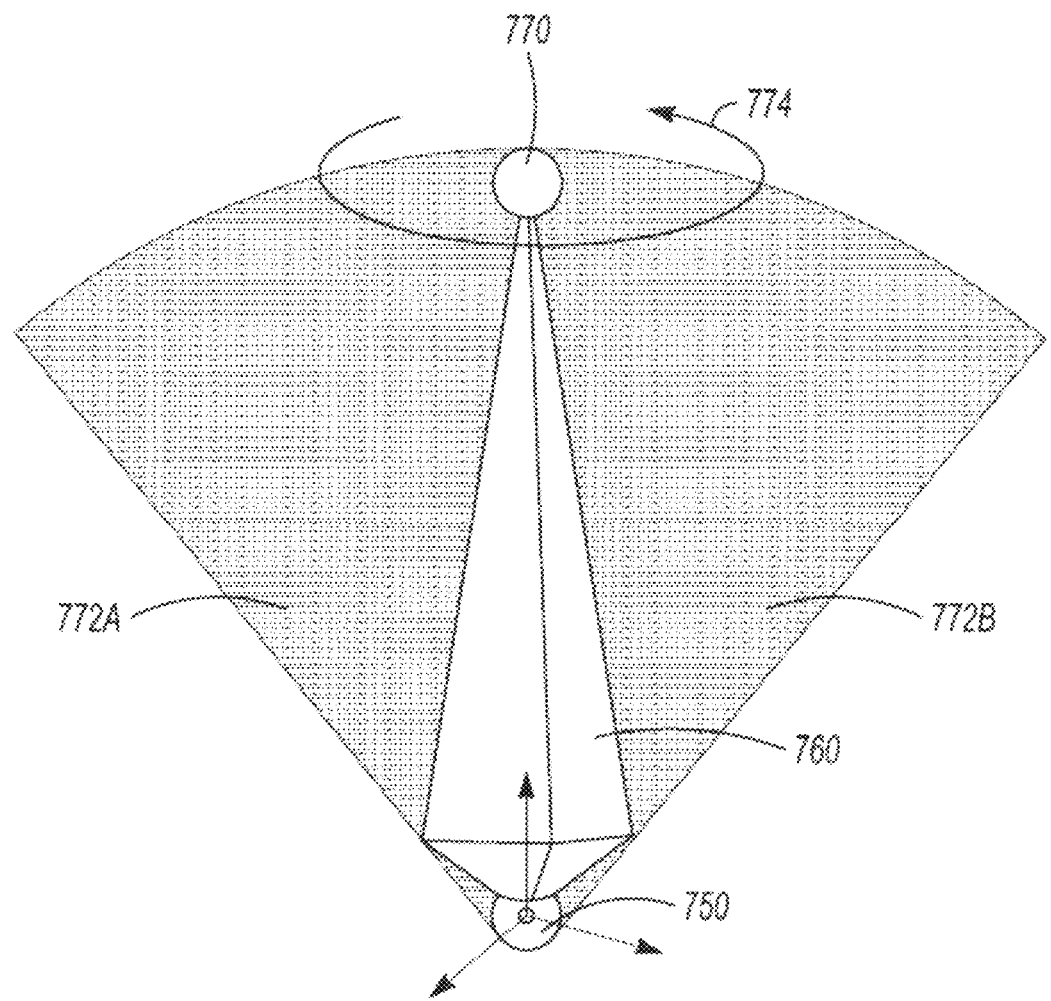
FIG. 7D illustrates aspects of a computer model that can be used as part of a system for generating and displaying animations in accordance with some embodiments.

FIG. 7C illustrates aspects of motion patterns 780 that can be used as part of an animation state-space in accordance with some embodiments, and FIG. 7D illustrates aspects of a computer model that can be used as part of a system for generating and displaying animations in accordance with some embodiments. FIG. 7D illustrates a bone 760 having joints 750 and 770. In FIG. 7D, joint 750 is a reference point for bone 760, and joint 770 is a control point, with motion patterns for control point 770 defined in a spherical surface 774 around joint 770 having a maximum range of motion 772 illustrated as range 772A and 772B.

Within a framework of a computer animation model control point 770 has motion patterns such as motion patterns 780 which are defined by motions of joint 770 along surface 774 within range of motion 772 with joint 750 as a fixed reference point for the particular motion pattern. In the computer animation model 700 of FIGS. 7A and 7B, each bone can have the same or different associated motion patterns and ranges of motion. For example, joint 701 can be a reference point for bone 710, joint 702 can be a reference point for bone 720, and joint 703 can be a reference point for bone 730. Skins 710A, 710B, and 710C illustrate an impact on the skin for corresponding control point motion relative to the reference point for the control point. For example, skin 710C shows the impact of joint 704 moving when joint 703 is stationary, skin 710B shows the impact of joint 703 moving when joint 702 is stationary, and skin 701A shows the impact of joint 702 movement relative to joint 701.

FIG. 7C illustrates the patterns traced by the control point relative to a plane which is perpendicular to the line created by extending the line through the reference point. Each pattern 780 for joint 703, then, can be considered a projection onto a plane that is perpendicular to the line extending from bone 720 through the point having joint 703. In a user interface where a designer is assigning probabilities to different motion states, a screen interface can display such projections and allow them to be selected and/or to have an associated input with a probability value assigned. Such an interface can enable a designer to create a pattern which will automatically be translated from the two dimensional projection of the interface into the motion pattern associated with the control point, with an assigned set of other variables (e.g. harmonic speed, phase relationship with the beat determining an offset in a repeated motion pattern, etc.).

Figure 7E:
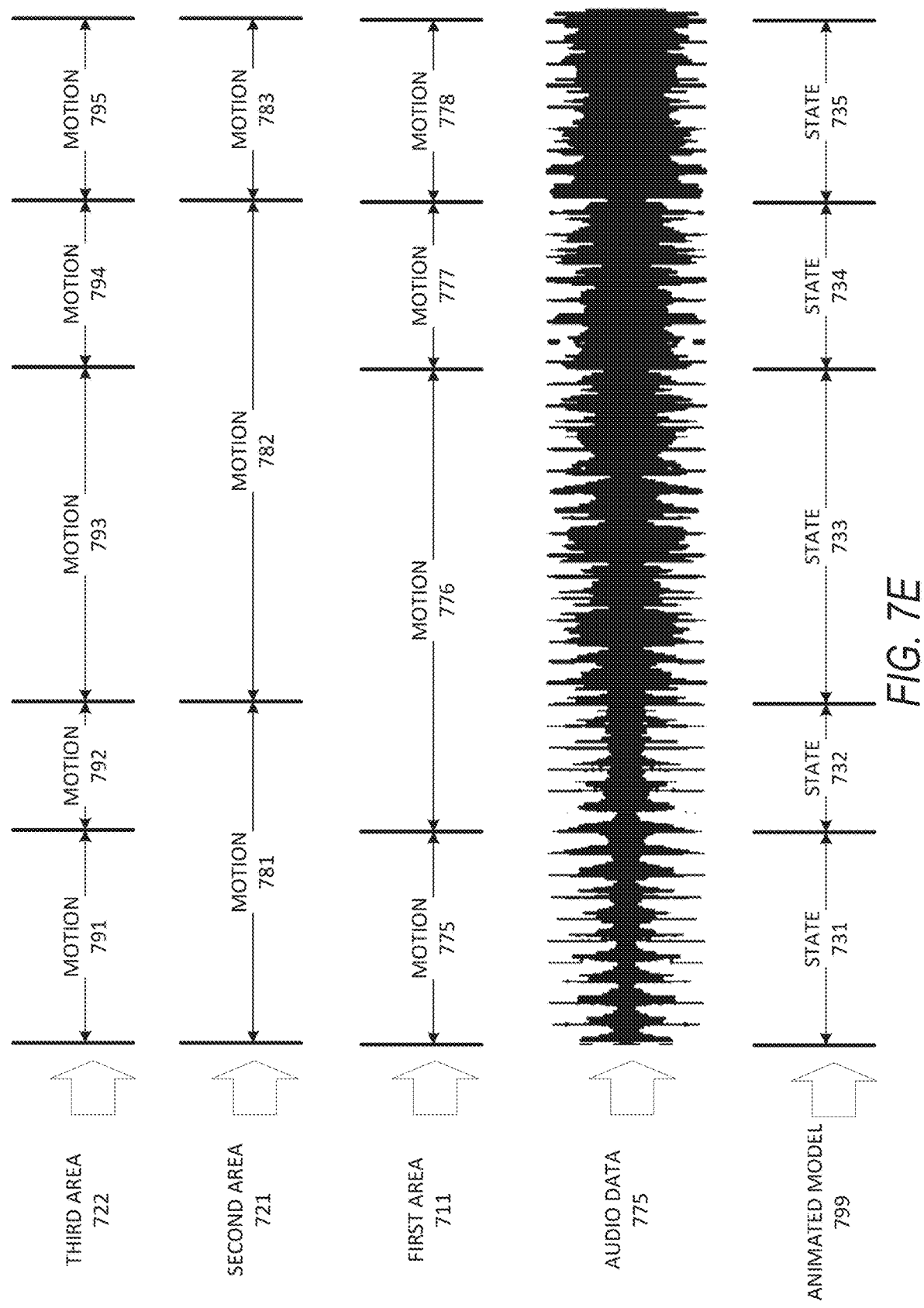
FIG. 7E illustrates aspects of a system for generating and displaying animations in accordance with some embodiments.
Figure 8:
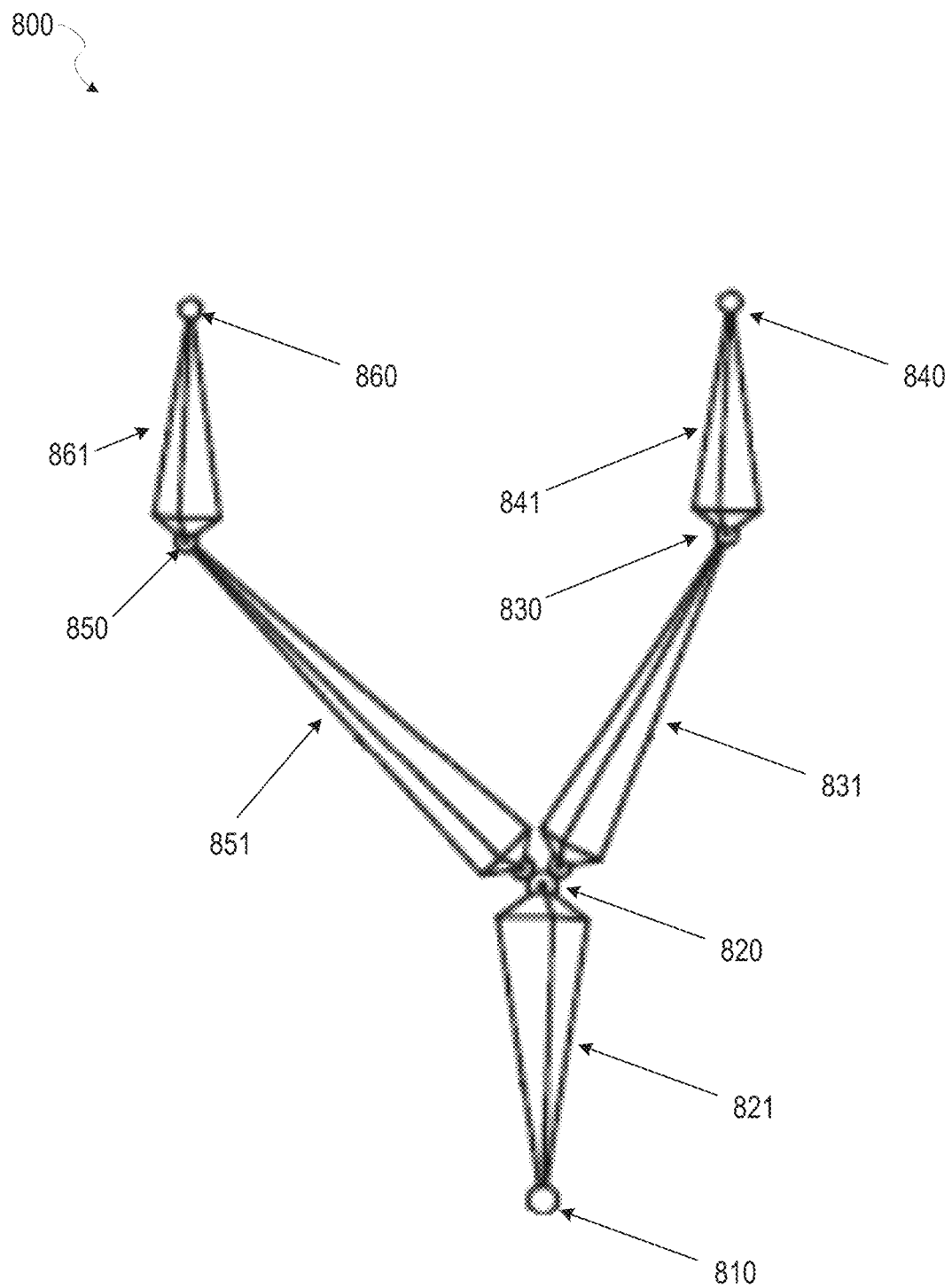
FIG. 8 illustrates aspects of a computer model that can be used as part of a system for generating and displaying animations in accordance with some embodiments.

In a computer animation model, each control point (e.g. an therefore each bone) can have independently assigned motion patterns, each having a separate probability. FIG. 7E illustrates aspects of a system for generating and displaying animations in accordance with some embodiments. In FIG. 7E, audio data 775 is received at a device implementing an output video animation using computer animation model 700. The animated model 799 transitions through motion states 731-735, with each motion state of motion states 731-735 made up of independent combinations of motions, speeds, and any other such assigned characteristics from a template. Each of the control points in the model can move independently, with first area 711 moving through motions 775-778 based on joint 702 moving in different patterns as described by the control point movement pattern for a selected state. Similarly, second area 721 uses different motions 781-783 and third area 722 uses motions 791-795. This can result in a wide variety of complex motions which occur in a pseudo random fashion synchronized to a beat.

For example, if the motion patterns for joints 702, 703, and 704 are set with all side to side motions synchronized together with a harmonic speed equal to the tempo of the audio data, the skin 710 will wave side to side with the beat. If joint 702 and 703 are set with the same side to side motion but half a repetition apart, with joint 704 a circle, the lower part of skin 710 will wiggle back and forth without swaying, and the top of the skin 710 will move in a circle. Because these movements are synchronized to harmonics of the audio data tempo, certain animations can give an impression of "dancing" or complex changing motion that is synchronized to the tempo in complex pseudorandom patterns.

Computer animation models can extend this template with bones having control points and reference points with associated motion patterns in complex ways. Computer animation model 800 illustrates a model with bones 821, 831, 841, 851, and 861, and joints 710, 820, 830, 840, 850, and 860. Just as with computer animation model 700, each bone can have a control point which can be set with motion patterns relative to a reference point on the same bone. For example, joint 860 can be a control point and joint 850 a reference point for bone 861. In order to simplify overall design of a computer animation model, the computer animation model can have one or more global or parent reference points. For example, joint 810 can be defined as a parent reference point, such that it operates as a reference point for at least one control point, but does not operate as a control point. A computer animation model can have multiple parent references points, such as if bone 831 is designed to be fixed with no movement, such that joints 830 and 820 can be parent reference points with joints 810, 840, 850 and 860 control points.

In some systems, rather than having every control point having independently assigned motions, inverse kinematics can be used to define motions for multiple control points as part of a single motion state. For example, one motion state for computer animation model 800 can use motion patterns for each joint other than joint 810 when joint 810 is operating as a parent reference point. A second motion state can have a motion pattern for joint 840 determined relative to joint 810, with the motions of joints 830 and 820 determined automatically in order to achieve the selected motion of joint 840. In such an embodiment, joints 850 and 860 can be determined using the previously discussed motion patterns while joint 840 has a motion determined relative to joint 810.

Thus, certain motion states can have one or more kinematic chains of bones, with the motion of a control point at the end of the kinematic chain selected as part of the motion state, and the control points within the kinematic chain determined automatically. During design of an animation, the limitations on the kinematic chain can be presented to a designer as part of an interface, with an option to create motion patterns within the limits of the range of motion for the chain. Alternatively, particular motions of a kinematic chain can be presented, with a designer selecting between possible motions. As described above, certain frameworks can include sets of motion patterns, with a designer simply assigning probabilities to preferred motions. This can function for both simple animations of a single bone that is part of a chain from a parent reference point through multiple bones with a control endpoint, as well as for inverse kinematic chains. Further, a state-space can include both states with motion patterns for each individual control point, motion patterns for kinematic chains, or both in the same state-space for a computer animation model.

Figure 9A:
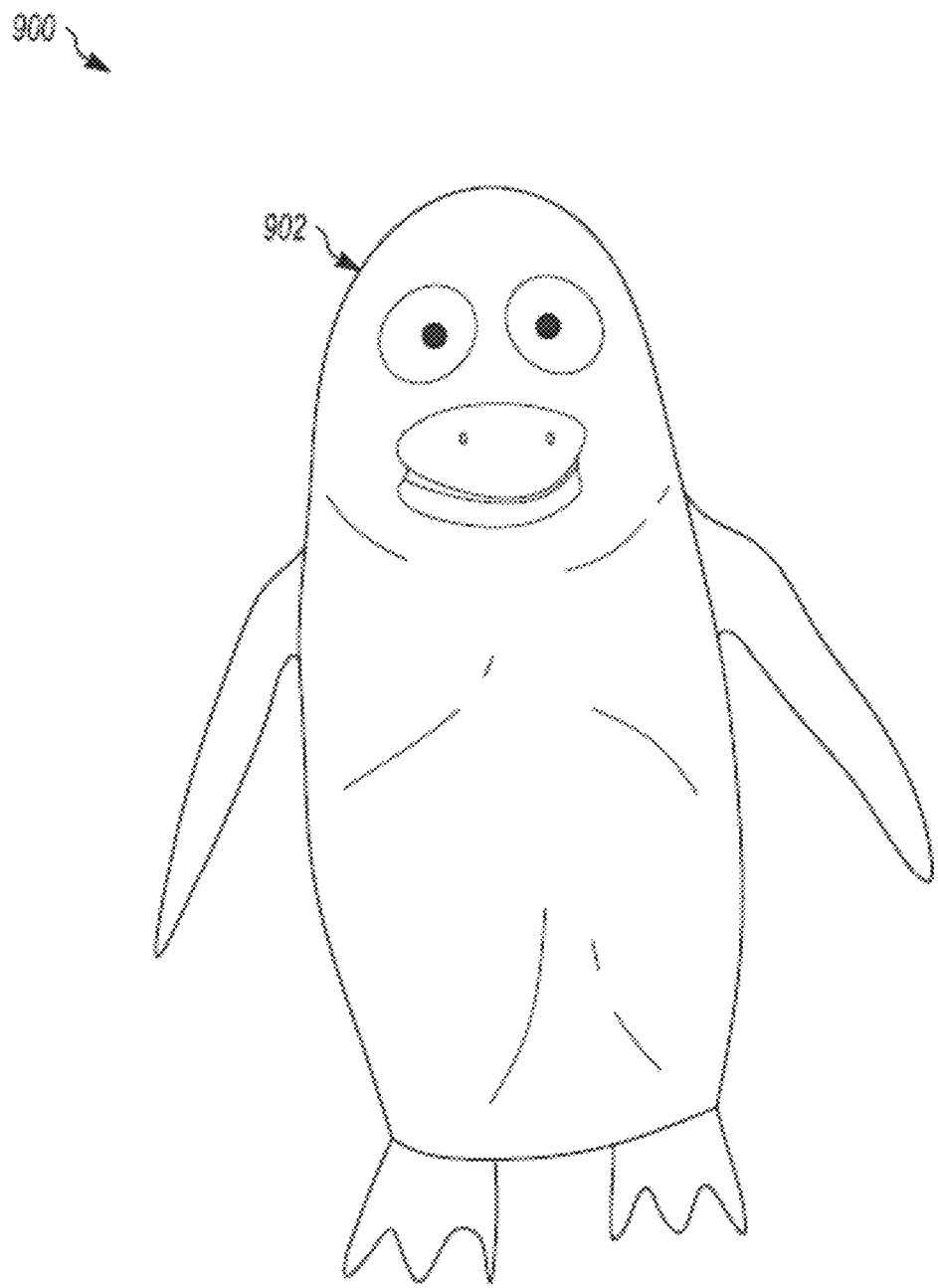
FIG. 9A illustrates aspects of a computer model that can be used as part of a system for generating and displaying animations in accordance with some embodiments.
Figure 9B:
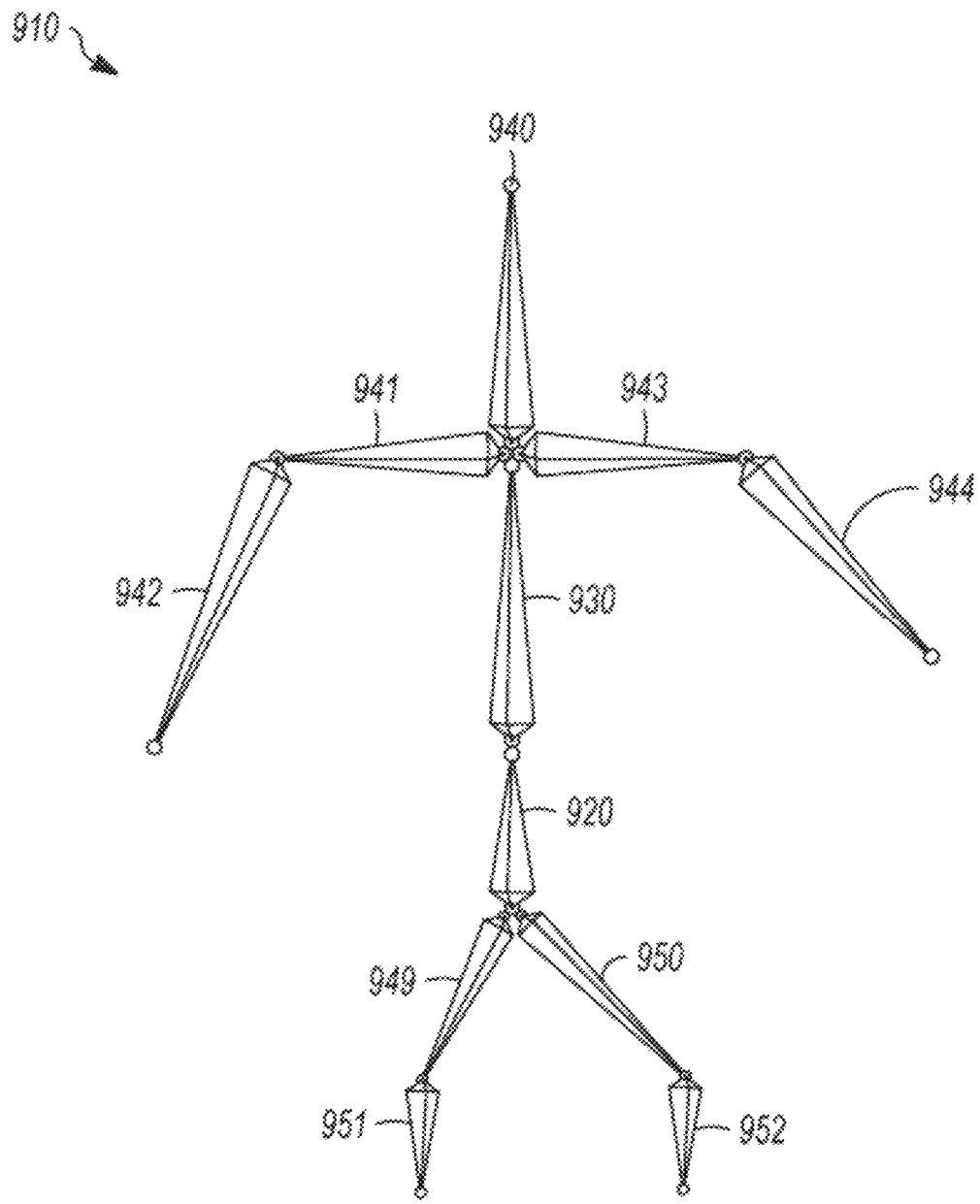
FIG. 9B illustrates aspects of a computer model that can be used as part of a system for generating and displaying animations in accordance with some embodiments.
Figure 9C:
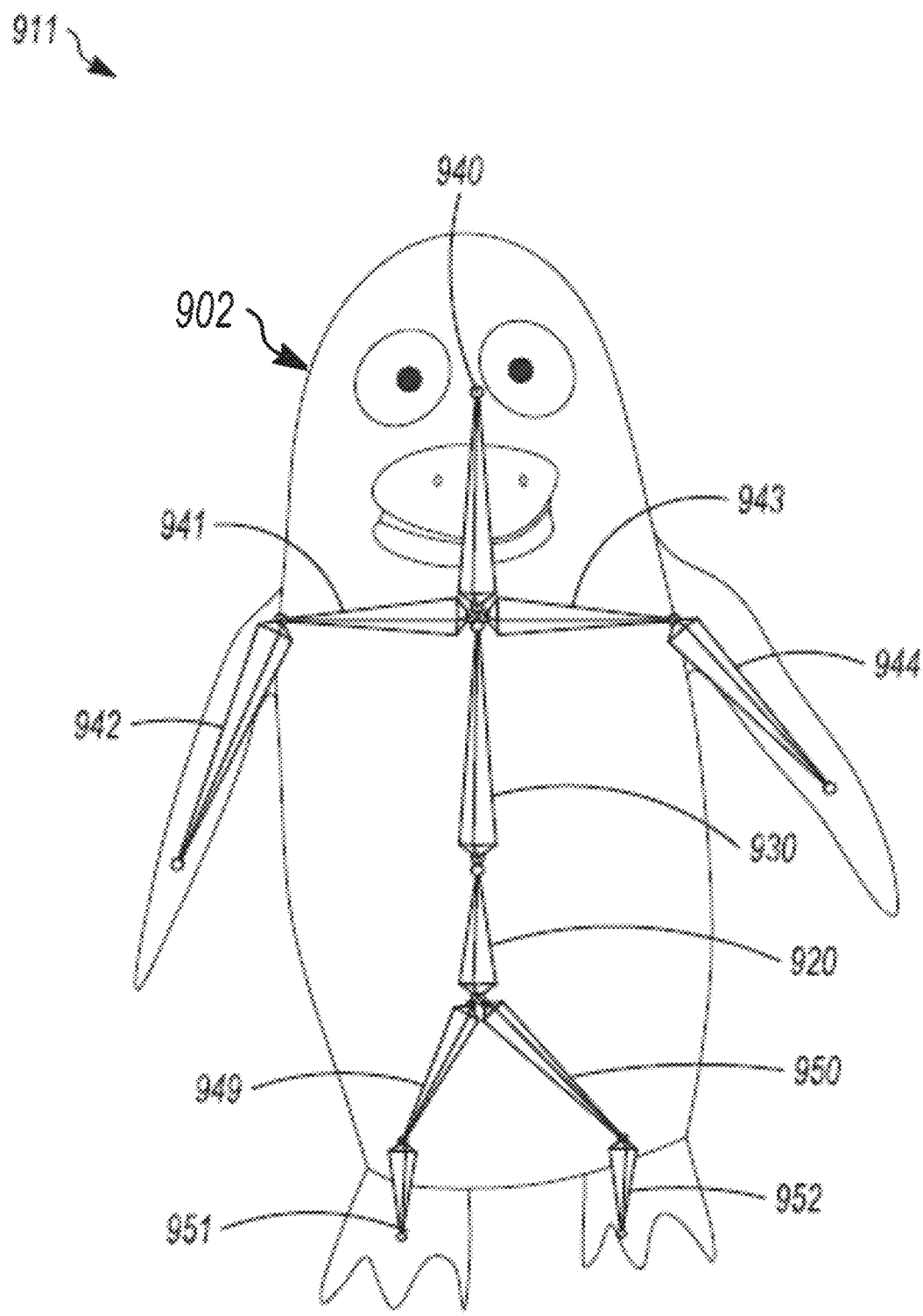
FIG. 9C illustrates aspects of a computer model that can be used as part of a system for generating and displaying animations in accordance with some embodiments.

FIGS. 9A-C then illustrate aspects of a computer model that can be used as part of a system for generating and displaying animations in accordance with some embodiments. Computer animation model 900 of FIG. 9A uses a skin 902 of a penguin that is configured to be animated using a pseudorandom computer animation model as described herein. FIG. 9B illustrates an internal structure 910 of the computer animation model 900, with bones 940-952. FIG. 9C illustrates an overlay 911 of structure 910 within skin 902 to illustrate how computer animation model 900 can generate a complex pseudo random animation in accordance with embodiments described herein.

As described above, a computer animation model can include instructions for generating an output video animation that is configured to animate control points of the model to present pseudorandom motion that is synchronized to audio data. In the example of FIG. 9C, a skeletal model having structure 910 includes bones 940-952. A framework for a computer animation model including data about bones 940-952 along with motion limitations for each bone, influence of each bone on the skin 902, along with any other such information that defines the possible options for a computer animation model. A designer can take the limitations provided by such a framework, including a default state-space of provided movement patterns for the bones, speed harmonics, and other such information, and can modify this information to generate a computer animation model that can be distributed via a network and implemented on a device to create an output video. Designer options can include creation of new motion patterns, selection of probabilities for motion states including specific motion patterns and speed harmonics, synchronization relationships for patterns between bones, selection of thresholds for different animation options or probabilities, or other such information for a specific implementation of a model that can be distributed via a messaging system.

For example, in some embodiments, bones 942 and 944 can have a range of motion that enables animation of the arm flippers in circles or above the head of the penguin model. A designer can select motions of bones 944 and 942 that limit the actual motions in a particular state-space to a simple flapping motion that is only a few degrees of range of motion, and with limited forward and backward movement of the bones relative to the plane of the body (e.g. a plane between the eyes and toes or another such plane separating the front and back of the model's skin). Similarly, motions for bones 951 and 952 can be limited to simple up and down "foot tapping" motions that are configured to match a beat or a harmonic of a detected tempo from audio data, even though the framework can enable more complex foot movement. Any such limitations can be selected as part of a user interface for selecting probabilities and/or state space elements for a particular model. Additionally, as described above, in addition to the state-space for model 900 including motion patterns for individual bones, certain embodiments of such a state-space can include inverse kinematic motion patterns for certain control points. For example, one inverse kinematic motion pattern can enable the bone 940 to move in a circular pattern while maintaining the endpoints of bone 940 perpendicular to a ground plane, such that a head portion of skin 902 circles without tilting. Such a state-space element can include automatic motions for bone 940, 930, and 920 while having independent motions for bones 951, 952 (e.g. foot tapping) 942, and 944 (e.g. flipper waving).

A designer can access design tools of a system (e.g. design tools management interface 208 of application 104 or other such tools) to either create a computer animation model from the ground up (e.g. by creating a model in the system) or by modifying a framework that is made available to the designer. In some embodiments, this can involve a design user interface. As described above, such a user interface can include one or more windows for illustrating animations for a particular state-space, such that multiple animations for multiple different motion states of the computer animation model state-space are displayed on a screen at the same time in different windows, with probabilities and/or other design options for each state-space having input interfaces. Such a design interface can include options for selecting elements such as different skins, modifications to bones of a model or control points of a model, options to generate motion patterns for addition to a state space, or other such options.

In some embodiments, different computer animation models can be displayed in such an interface as tiles that describe a particular computer animation model. In addition to including computer animation details, such a display can include additional elements, such as inclusion of the animation as part of an augmented reality image, or as part of an overlay or modification to stored data. Such a display can thus show a single stored video clip in multiple windows of a display with different animations from one or more computer animation models included in each window.

In some embodiments, tools for filtering motion states or selecting groups of motion states can be present. For example, an interface can allow all motion states at a harmonic less than the tempo to be set to zero (e.g. all speed harmonics less than 1×). Some inputs can allow all motions of certain control points to be suppressed. Some inputs can be used to characterize certain motion patterns, such as a motion that creates an animation velocity above a certain speed, or acceleration or jerk motion values above provided thresholds. For motion patterns that are not strictly defined, but simply create random motion within a range (e.g. motion pattern 620), limits can be provided for the motions within the range, such as number of momentum changes per unit time, maximum velocity, or other such characteristics of the motion. In some embodiments, energy-based motion activation can be used for portions of a skeleton or two-dimensional model. For example, in one embodiment, a kinetic energy of a model can be defined by:

$$KE = \sum_{j \in joints} \frac{1}{2} I_j \omega_j^2; \qquad (3)$$

where KE is the corresponding model motion energy for a particular set of motion data values of the set of values, j is a summation value used to iterate over the number of joints of the plurality of animation elements. In such a model:

$$I_j = \sum_{k \in child} \frac{1}{2} w(k) r_{jk}^2: \text{Moment of Inertia} \qquad (4)$$

where w( ) is the angular velocity at a joint summed for a given value of j, k is the iteration value for a number of child joints attached to a parent joint within the computer model, r is the radius of each joint from an energy reference point (e.g. a parent or global reference point for a particular motion state), and where the angular velocity is determined individually for each motion pattern and each speed harmonic of the plurality of motion patterns and the plurality of speed harmonics.

In such a system, each motion state can have assigned energy values. If a state includes randomness within the motion (e.g. motion pattern 620), an average and maximum kinetic energy can be determined based on the randomness allowed. This information can then be used in a variety of ways. In some embodiments, minimum and maximum energy values can be selected by a designer, and all motion states of the state-space for a model outside these thresholds can be suppressed (e.g. set to a zero probability). In some embodiments, different energy states can be matched to different characteristics of audio data. For example, on set of energy thresholds can be used to set a state-space that is used for a first set of audio characteristics, and a second set of energy thresholds can be used to set a state-space for different audio characteristics. Similarly, an "energy" value based on frequency content, beats, or other such audio analysis can be used to match high-energy audio data to particular kinetic energy range state-spaces.

The use of different state-spaces under different circumstances enables, for example, different state-spaces to be used for different ranges of musical tempo. For example, when no music is detected, a first state-space for a model can be used, when a tempo less than a first threshold value is detected, a second state-space can be used, and when a tempo above the first threshold is detected, a third state-space can be used. This allows for additional synchronization of the pseudorandom animation to different circumstances, and to customize motions (e.g. "dance" moves or combinations of motions from a particular state space) to be customized to different audio data within a single implementation of a computer animation model being executed on a device.

Once a designer has finalized the configurable options for a computer animation model, the data for the finalized model can be made available through a messaging server system 108 or a messaging client application 104. In some embodiments, a user of a messaging client application 104 can access the model data, and include the model data in a message sent to another client device via messaging server system 108. When the receiving client device 102 plays the message, the model is implemented on the receiving client device 102 via messaging client application 104 to generate a video display. If no audio is detected, or if a threshold audio characteristic is not present, the receiving device 102 can simply display the skin or other aspect of the computer animation model in a display with a default animation or with no animation. If audio data is present, the receiving client device analyzes the audio data for audio characteristics such as a tempo value, and then uses the tempo value with motion states of the computer animation model to begin a video animation. An initial motion state is selected randomly from the possible motion states based on the probabilities for each motion state within the data received at the receiving client device. As long as the audio data is present and the receiving client device 102 is configured to continue the video animation, the computer animation model data will transition randomly between the motion states of the state-space for the model. The animation will end when the audio data ends or when the output animation is halted by a user input. In other embodiments, other options can halt an animation, such as an animation time, an ephemeral timer for a message that includes the data for the pseudorandom animation, or other such options. If the animation is part of an ephemeral message, after the message is presented with the pseudorandom animation and a deletion trigger is met, the model data is deleted from the receiving client device 102, so that additional animations using the particular computer animation model are not possible unless the model is retrieved independently or otherwise made available outside of the ephemeral message.

As described above, some embodiments can use different thresholds for starting dance animations as part of a pseudorandom animation model. Some models can require a certain beat strength or consistency. Certain models can have a trigger, such as an audio password to begin the animation. Certain models can be configured to animate only when audio data with a tempo between a certain threshold (e.g. between 30 beats per minute and 120 beats per minute) are present.

Figure 10:
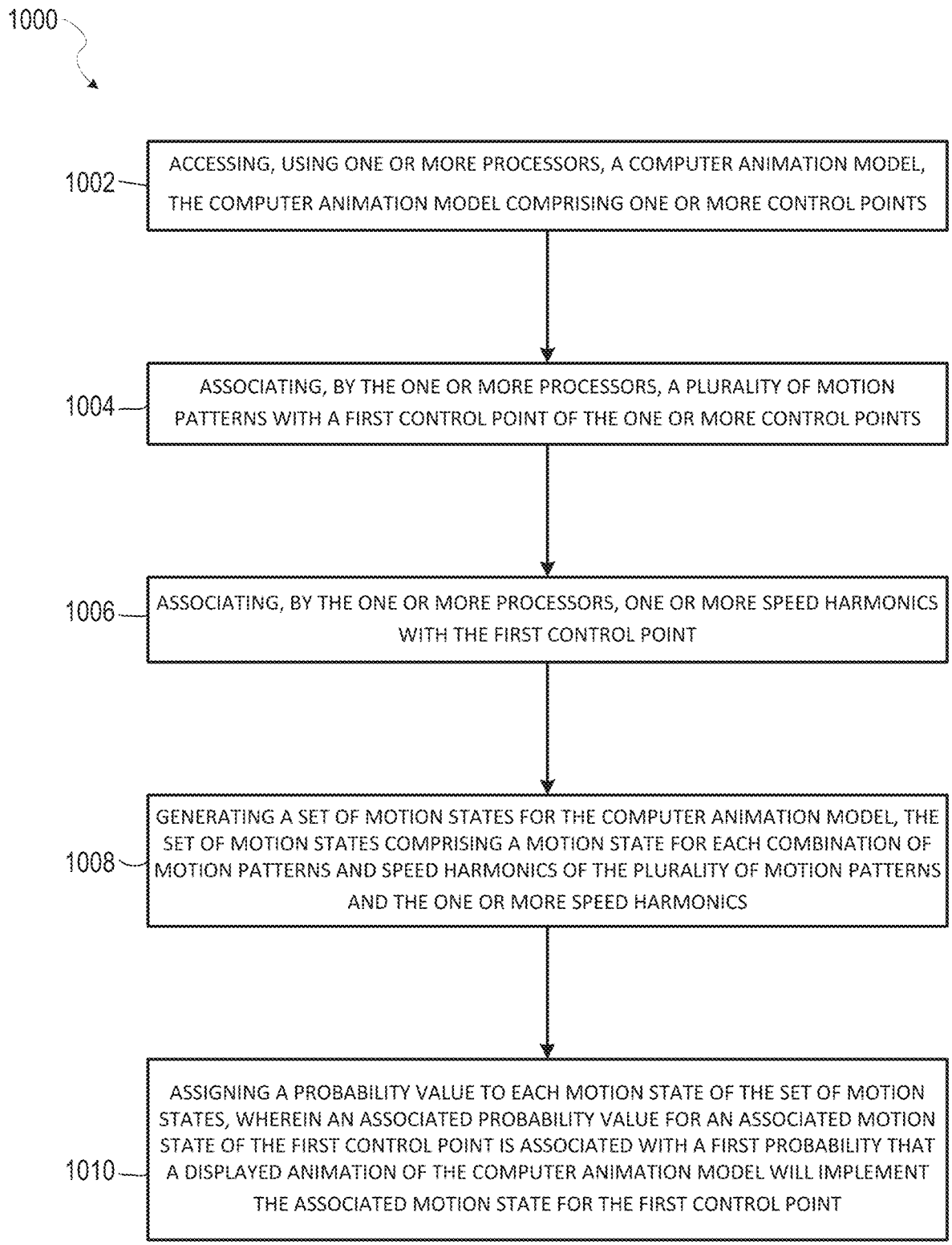
FIG. 10 illustrates an example method in accordance with some embodiments described herein.

FIG. 10 illustrates an example method 1000 in accordance with some embodiments described herein. FIG. 10 is a flowchart illustrating a method for managing a state-space for a pseudo random computer animation model, according to certain example embodiments. Method 1000 may involve operations at a client device 102 in conjunction with operations of a messaging server system 108. In some embodiments, method 1000 is embodied in computer-readable instructions stored in a non-transitory storage of a client device 102 that performs method 1000 when the instructions are executed by processing circuitry of the client device 102.

Method 1000 begins with operation 1002 accessing, using one or more processors, a computer animation model, the computer animation model comprising one or more control points. In various embodiments, this operation can be performed by a mobile device, a design computer, or any other such device. The method then proceeds with operation 1004 of associating, by the one or more processors, a plurality of motion patterns with a first control point of the one or more control points. During creation of a computer animation model from a basic design without a framework, this can involve selection or creation of motion patterns. If the computer animation implementation is being generated from a framework, this can involve selecting motion patterns from a set of standard motion patterns or adjusting motion patterns previously assigned to the computer animation model. Then one or more speed harmonics are associated with the first control point in operation 1006. As detailed above, this does not set a specific animation speed for a motion pattern, but sets a speed that will be determined later as referenced to a tempo of audio data used in conjunction with generation of the actual display of a pseudo random animation on a screen using the set of motion states defined by method 1000.

Following selection of the speed harmonics and the motion patterns for the control points to define the elements of the computer animation model state-space, operation 1008 then involves generating a set of motion states for the computer animation model (e.g. the set of motion states defined by the elements of the state-space defined above), the set of motion states comprising a motion state for each combination of motion patterns and speed harmonics of the plurality of motion patterns and the one or more speed harmonics. In other embodiments, additional elements, such as a synchronization (e.g. phase) for display of particular motion patterns relative to a beat or audio data reference, threshold values to enable different state-space motion states for different audio environments, or other such elements can be part of the set of motion states. Once the set of motion states are defined (e.g. the selected states of the state-space for the model), operation 1010 involves assigning a probability value to each motion state of the set of motion states, wherein an associated probability value for an associated motion state of the first control point is associated with a first probability that a displayed animation of the computer animation model will implement the associated motion state for the first control point.

Some such embodiments can involve generating an output video comprising the displayed animation of the computer animation model with motion of the computer animation model generated randomly using the probability value for each motion state of the plurality of motion states. Some embodiments involve receiving a set of user inputs selecting the plurality of motion patterns for the first control point from the motion patterns and the one or more speed harmonics from the tempo harmonics and automatically assigning the corresponding probability for each motion state of a subset of motion states not associated with the plurality of motion patterns to zero. Some such embodiments function by automatically assigning the corresponding probability for each motion state of a second subset of motion states associated with the set of user inputs to equal probability values. Other embodiments operate where the set of user inputs further select probability values for motion states associated with the plurality of motion patterns and the one or more speed harmonics.

As described above, in some embodiments, a computer animation model comprises a skeleton and a skin, with the skeleton made up of a plurality of bones connected via one or more joints, with each bone comprising a control point, and with the first control point at s a first position on a first bone of the plurality of bones. The first bone can be a child bone connected to a reference point via one or more connected bones within the skeleton. The first motion pattern of the plurality of motion patterns can be an inverse kinematic motion pattern, whereby the first motion pattern is determined relative to the reference point with motions of the one or more connected bones within the skeleton determined to maintain connections with the one or more connected bones while achieving the first motion pattern for the first position on the first bone, and with motions of the one or more connected bones determined automatically. In some such embodiments, the set of user inputs selecting the plurality of motion patterns select the plurality of motion patterns as inverse kinematic motion patterns presented on a user interface display as two dimensional patterns projected into a user selected plane.

Alternatively, a first motion pattern of the plurality of motion patterns can be a forward kinematic motion pattern, whereby the first motion pattern is determined relative to a connection point with a second bone of the one or more connected bones, and without references to the reference point.

Various such embodiments can operate where the second bone is associated with a second plurality of motion states and second one or more speed harmonics and the set of motion states further comprises comprising motion states for each combination of motion patterns and speed harmonics of the first bone and the second bone. Similarly, some embodiments can operate where the set of user inputs selecting the plurality of motion patterns select the plurality of motion patterns as from the motion patterns on a user interface display as two dimensional patterns illustrating motion patterns for a bone revolving around a joint. Other embodiments can operate with a user interface for selecting or creating motion patterns and assigning motion patterns to a state-space in any manner described herein.

Figure 11:
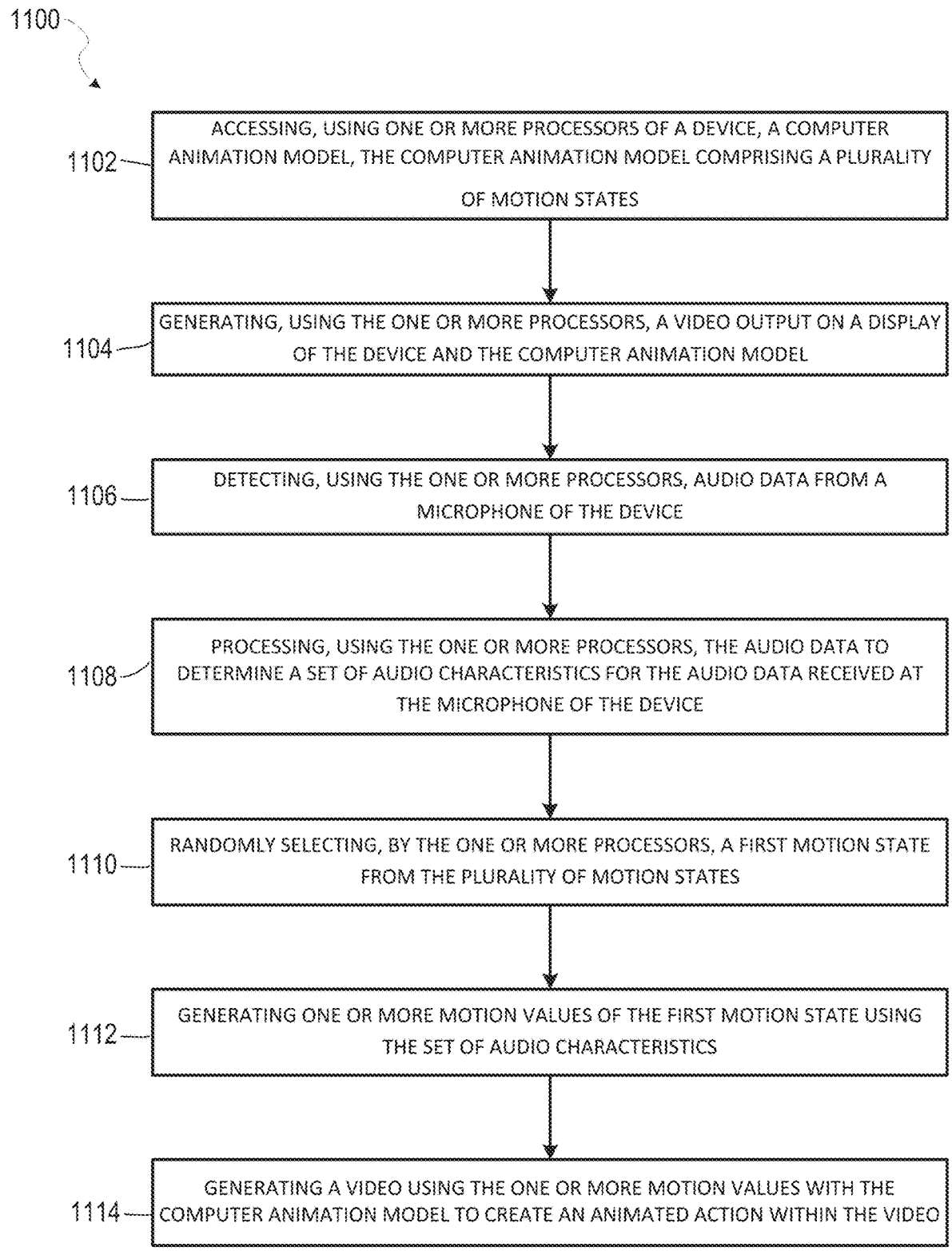
FIG. 11 illustrates an example method in accordance with some embodiments described herein.

FIG. 11 illustrates an example method 1100 in accordance with some embodiments described herein. FIG. 11 is a flowchart illustrating a method for generating and displaying an animation using a pseudo random computer animation model, according to certain example embodiments. Method 1100 may involve operations at a client device 102 in conjunction with operations of a messaging server system 108. In some embodiments, method 1100 is embodied in computer-readable instructions stored in a non-transitory storage of a client device 102 that performs method 1100 when the instructions are executed by processing circuitry of the client device 102.

Method 1100 begins with operation 1102 accessing, using one or more processors of a device, a computer animation model, where the computer animation model includes a plurality of motion states. Operation 1104 then involves generating, using the one or more processors, a video output on a display of the device and the computer animation model, and operation 1106 involves detecting, using the one or more processors, audio data from a microphone of the device. Depending on the timing of the audio data and the particular images associated with a computer animation model, the initial frames displayed on the video output using the computer animation model can include stationary images generated and applied to the video frames, or default animation images. The audio data is processed in operation 1108 to determine a set of audio characteristics for the audio data received at the microphone of the device. As detailed above, when music having a beat is present, a tempo value can be detected as part of this processing, with the tempo value used to determine animation speeds for motion patterns of the computer animation model. Operation 1110 involves randomly selecting, by the one or more processors, a first motion state from the plurality of motion states. Operation 1112 involves generating one or more motion values of the first motion state using the set of audio characteristics (e.g. the harmonic speed times the tempo value to determine how frequently a motion pattern is repeated). Operation 1114 then involves generating a video using the one or more motion values with the computer animation model to create an animated action within the video. The animated action within the video includes a motion of a skin (e.g. a skin image of a three dimensional model from a perspective of the video or a two dimensional surface image of a two dimensional model associated with the computer animation model).

Such embodiments can operate where the set of audio characteristics comprises a tempo value, and where generating the one or more motion values comprises selecting a motion pattern speed for a first control point of the computer animation model to match a first harmonic of the tempo value. Such embodiments can further involve periodically randomly selecting a new motion state from the plurality of motion states, generating one or more new motion values of the new motion state using the set of audio characteristics, and updating the video using the one or more new motion values with the new motion state to change the animated action within the video.

Some embodiments further involve updating the set of audio characteristics over time in response to changes in the audio data and updating the one or more motion values in response to changes in the set of audio characteristics over time. For some such embodiments, the computer animation model is associated with one or more audio animation criteria used to initiate the animated action within the video. Additionally, in some embodiments, the method can further involve comparing the set of audio characteristics with the one or more audio animation criteria and selecting a default state for the computer animation model when the set of audio characteristics does not meet the one or more audio animation criteria, wherein the plurality of motion states does not include the default state. Other criteria can be used as described above for initiating the animation or for selecting different animation state-spaces based on analysis of audio data and matching to a designed motion state-space for a computer animation model.

In some embodiments, the set of audio characteristics comprises an audio energy value and the first motion state is randomly selected from a subset of the plurality of motion states based on the audio energy value, wherein the subset of the plurality of motion states comprise an audio energy match characteristic associated with the audio energy value. In some such embodiments, the set of audio characteristics further comprises a beat value, a tempo value, a melody value, and a danceability value. Similarly, in some embodiments, the audio energy value and the danceability value are based on a beat consistency over time value and a fundamental frequency value associated with a melody of the audio data. Other embodiments can use other such combinations or other data characteristics.

Figure 12:
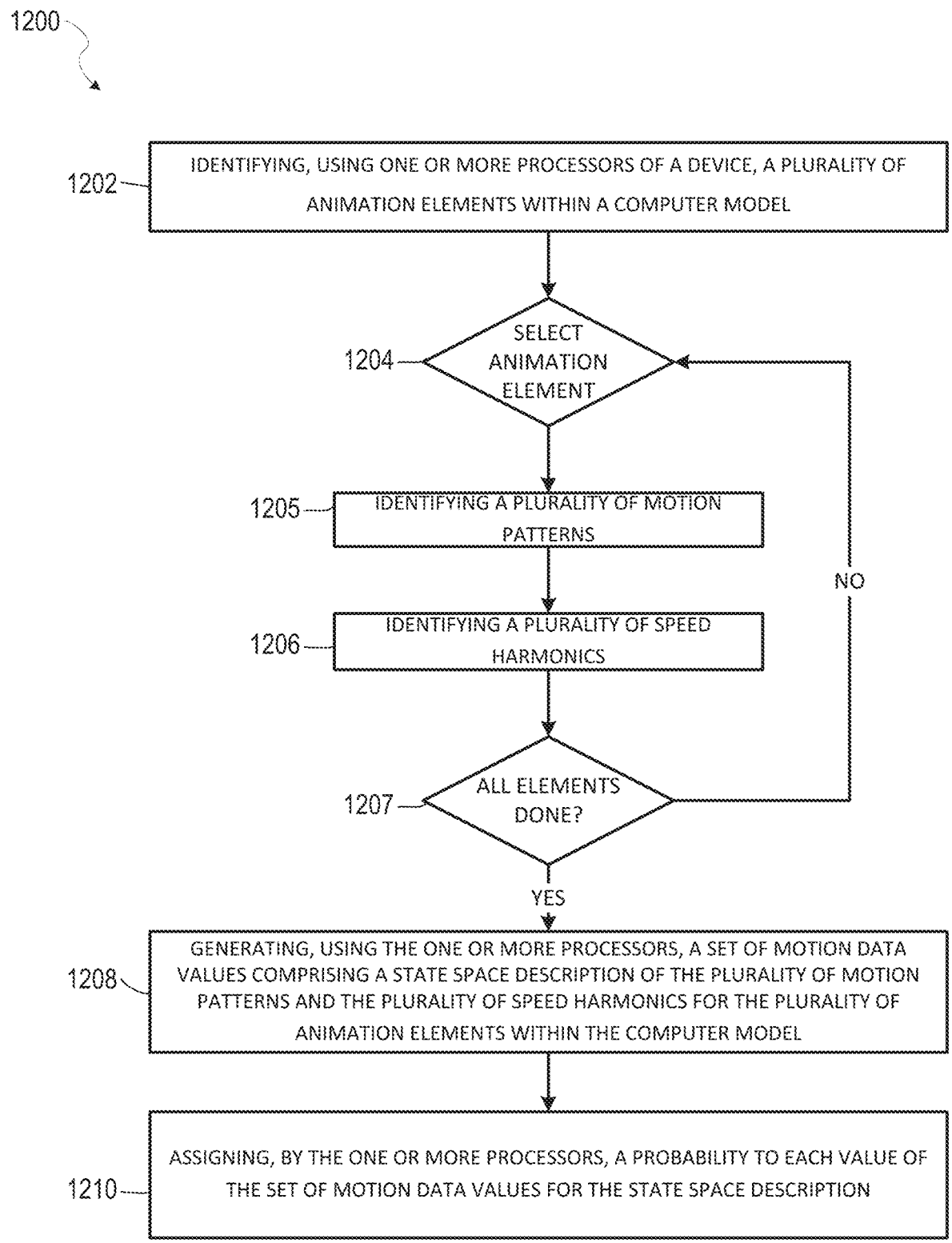
FIG. 12 illustrates an example method in accordance with some embodiments described herein.

FIG. 12 illustrates an example method 1200 in accordance with some embodiments described herein. FIG. 12 is a flowchart illustrating a method for managing a state-space for a pseudo random computer animation model, according to certain example embodiments. Method 1200 may involve operations at a client device 102 in conjunction with operations of a messaging server system 108. In some embodiments, method 1200 is embodied in computer-readable instructions stored in a non-transitory storage of a client device 102 that performs method 1200 when the instructions are executed by processing circuitry of the client device 102.

Method 1200 begins with operation 1202 identifying, using one or more processors of a device, a plurality of animation elements within a computer model. Then in operation 1204 an animation element (e.g. a control point or fixed motion element such as a bone or two dimensional pattern with association motions) is selected. In operations 1205 and 1206, motion pattern(s) and speed harmonic(s) are associated with the selected animation element. In operation 1207, this is repeated until a check confirms that all animation elements have been set in the state space description for the implementation of the computer model. Then in operation 1208, the set of motion data values are generated comprising a state space description of the plurality of motion patterns and the plurality of speed harmonics for the plurality of animation elements within the computer model, and in operation 1210, a probability is assigned to each value of the set of motion data values for the state space description. This data, including the assigned probability, can then be distributed and used in creating pseudorandom animations as described herein.

In various embodiments, the probability for each value of the set of motion data values is selected via a user input through an overlay management interface configured to suppress unselected values of the state space in order to create a selected state space with probabilities for motion combinations of the plurality of motion patters based on matching the selected state space with a set of dance motion values. In some such embodiments, the computer model and the plurality of animation elements are generated by processing an image using an overlay template to generate the computer model and the plurality of animation elements. Some such embodiments then operate by generating, on a display of a user device, an output image using the image, the computer model, and the plurality of animation elements, processing audio inputs to identify a set of audio characteristics for audio data received at a microphone of the user device, and animating the output image using the skinned model and the set of motion data values including the probability for each value of the set of motion data values.

Similarly, some embodiments further involve configurations where identifying the plurality of motion patterns comprises receiving, via a user interface input of an overlay management interface, a user selection of the plurality of motion patterns selected from a set of system motion patterns, wherein a subset of the set of system motion patterns is selected for each animation element of the plurality of animation elements, and such embodiments can also operate where identifying the plurality of speed harmonics comprises selecting a speed harmonic for each user selection of the plurality of motion patterns, such that the state space description of the plurality of motion patterns comprises the selected combinations of motion patterns and speed harmonics for each of the plurality of animation elements.

In some embodiments, assigning the probability to each value of the set of motion data values for the state space description can involve displaying a first animation comprising a first animation element animated with a first combination of a first motion pattern and a first speed harmonic for a selected tempo and receiving a user input assigning a corresponding probability for the first animation element, the first motion pattern, and the first speed harmonic.

Some embodiments can operate where assigning, by the one or more processors, the probability to each value of the set of motion data values for the state space description involves, for each animation element of the plurality of animation elements and each of the selected combinations of motion patterns and speed harmonics for each animation element: displaying an output animation of the computer model with a corresponding combination of each motion pattern and speed harmonics for a corresponding animation element; and receiving a corresponding user input assigning a corresponding probability to generate the probability to each value of the set of motion data values for the state space description. In some such embodiments, the set of audio characteristics comprises a tempo value and a danceability value, and the danceability value can involve a value derived from a beat consistency score and at least one music energy criteria. In other embodiments, other criteria for such an audio characteristic can be used.

In some embodiments, an output image is animated during a first time period when the audio data meets the at least one music energy criteria and wherein the output image is not animated during a second time period when the audio data does not meet the at least one music energy criteria.

The set of audio characteristics can, in some embodiments, include a plurality of audio energy characteristics, with each of the plurality of audio energy characteristics is associated with a corresponding differing probability for each value of the set of motion data values for the state space description to match differing audio energy characteristics with differing motion values of the state space.

Some embodiments involve generating a set of normalized audio energy values based on a set of standard audio input characteristics, selecting a minimum audio energy threshold and a maximum audio energy threshold, calculating a model motion energy for each value of the set of motion data values for the state space description using a first motion model, matching the first motion model to the set of normalized audio energy values, and assigning a zero probability to a set of values of the set of motion data values for the state space description where a corresponding model motion energy is less than the minimum audio energy threshold or greater than the maximum audio energy threshold as matched from the first motion model to the set of normalized audio energy values. Other embodiments can use other such configurations for thresholds to determine pseudorandom animations for a computer animation model as described herein.

Figure 13:
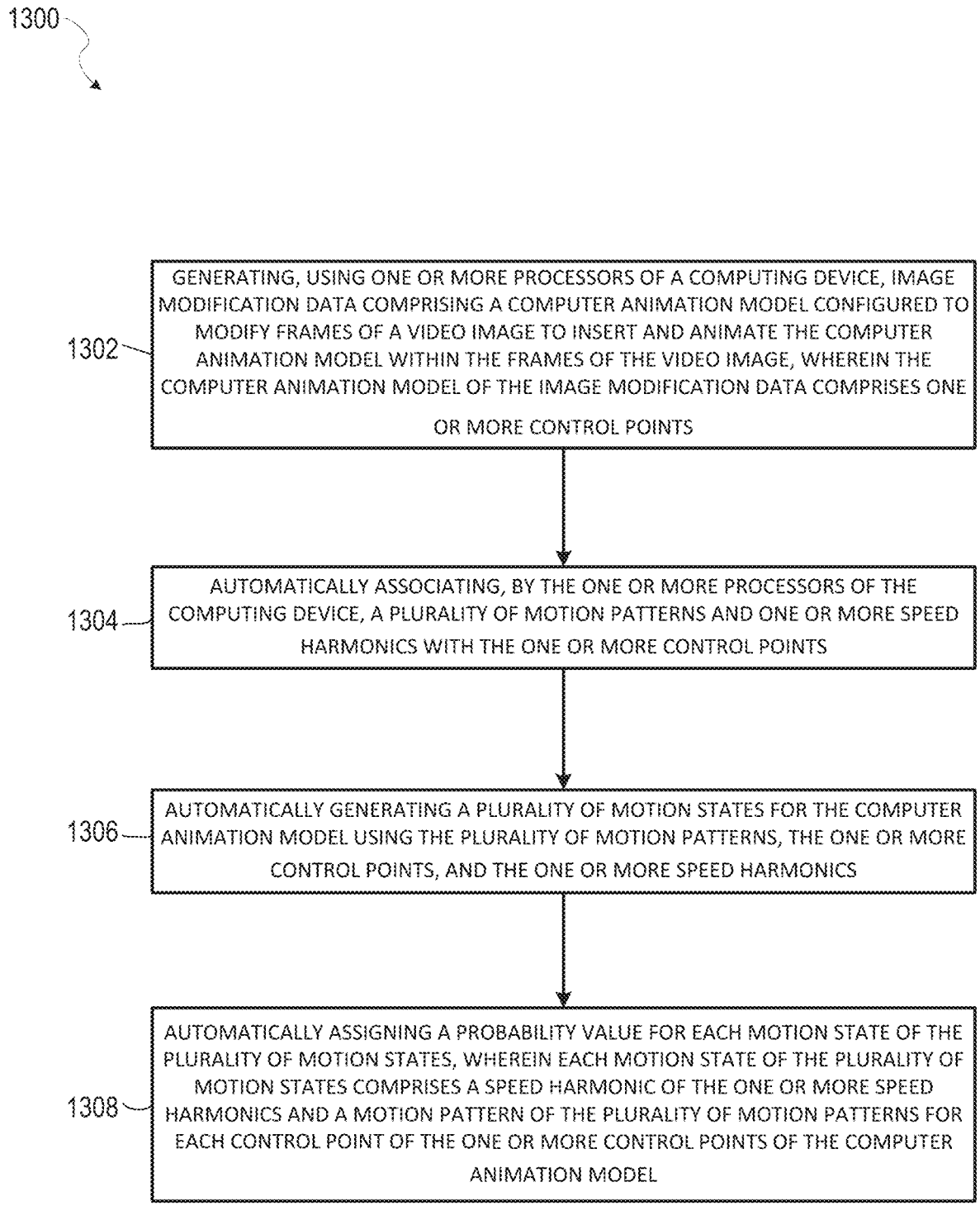
FIG. 13 illustrates an example method in accordance with some embodiments described herein.

FIG. 13 illustrates an example method 1300 in accordance with some embodiments described herein. FIG. 13 is a flowchart illustrating a method for designing and selecting managing a state-space for a pseudo random computer animation model, according to certain example embodiments. Method 1300 may involve operations at a client device 102 in conjunction with operations of a messaging server system 108. In some embodiments, method 1300 is embodied in computer-readable instructions stored in a non-transitory storage of a client device 102 that performs method 1300 when the instructions are executed by processing circuitry of the client device 102.

Method 1300 begins with operation 1302 generating, using one or more processors of a computing device, image modification data comprising a computer animation model configured to modify frames of a video image to insert and animate the computer animation model within the frames of the video image, wherein the computer animation model of the image modification data comprises one or more control points. Following operation 1302, operation 1304 involves automatically associating, by the one or more processors of the computing device, a plurality of motion patterns and one or more speed harmonics with the one or more control points. In other embodiments, other elements can be associated with the control points, or modifications to existing associations can be made is such operations.

Operation 1306 involves automatically generating a plurality of motion states for the computer animation model using the plurality of motion patterns, the one or more control points, and the one or more speed harmonics. An initial set of motion states can be automatically assigned in such embodiments, with additional modifications made either in response to designer criteria, specific modifications of individual motion states or state-space elements included by designer selection, or other such operations. Operation 1308 then involves automatically assigning a probability value for each motion state of the plurality of motion states, wherein each motion state of the plurality of motion states comprises a speed harmonic of the one or more speed harmonics and a motion pattern of the plurality of motion patterns for each control point of the one or more control points of the computer animation model. The automatic assignment can involve assigning certain probability values to certain motions or combinations of motions, or a set of default probabilities. Such probabilities can then be updated based on designer selections.

The speed harmonic for each motion state is, in some embodiments, configured to set an animation speed for the motion pattern to repeat on a harmonic of a tempo value of audio data collected by a user device executing the image modification data. Example embodiments can operate where the harmonic of the tempo value is selected from 1, 2, 4, 0.5, 0.25, and 0.125 of the tempo value. Other embodiments can use any designer selected harmonic used to match complex motions to audio data.

A probability selection user interface can, in some embodiments, be used by a designer to select probabilities for a state space using an interface on a display of the computing device. In some such embodiments, the probability selection user interface including an animation window comprising an animated video of the computer animation model for a motion state, and a selectable probability weight for the motion state. Similarly, in some embodiments, a probability selection user interface displays a plurality of animation windows each associated with a corresponding motion state and a corresponding selectable probability weight for the corresponding motion state. In some such embodiments, a probability selection user interface further includes a filter input for sorting motion states illustrated within the probability selection user interface, and in some such embodiments, the filter input sorts the motion states illustrated based on one or more of a motion type, a harmonic speed, and a control point.

Each motion state can, in various embodiments, be associated with a selectable energy threshold, such that the corresponding selectable probability weight for the corresponding motion state is based on audio characteristics of audio data used by the image modification data to animate the computer animation model within the frames of the video image. In such embodiments, a probability selection user interface further can include an energy threshold input for each motion state, and one or more selectable audio energy samples. In some such embodiments, a computer animation model comprises a two-dimensional overlay generated by analyzing content of the frames of the video image and replacing portions of the frames of the video image with one or more animation elements. In other embodiments, computer animation model comprises an overlay generated by analyzing content of the frames of the video image and replacing portions of the frames of the video image with a representation of a three-dimensional model comprising a skin over a skeleton model comprising the one or more control points.

Various example embodiments an methods are described above. It will be understood that, while specific structures and sets of operations are described, intervening or repeated structures and operations are possible within the scope of the embodiments described herein, and the specifically described examples are not exhaustive.

Software Architecture

Figure 14:
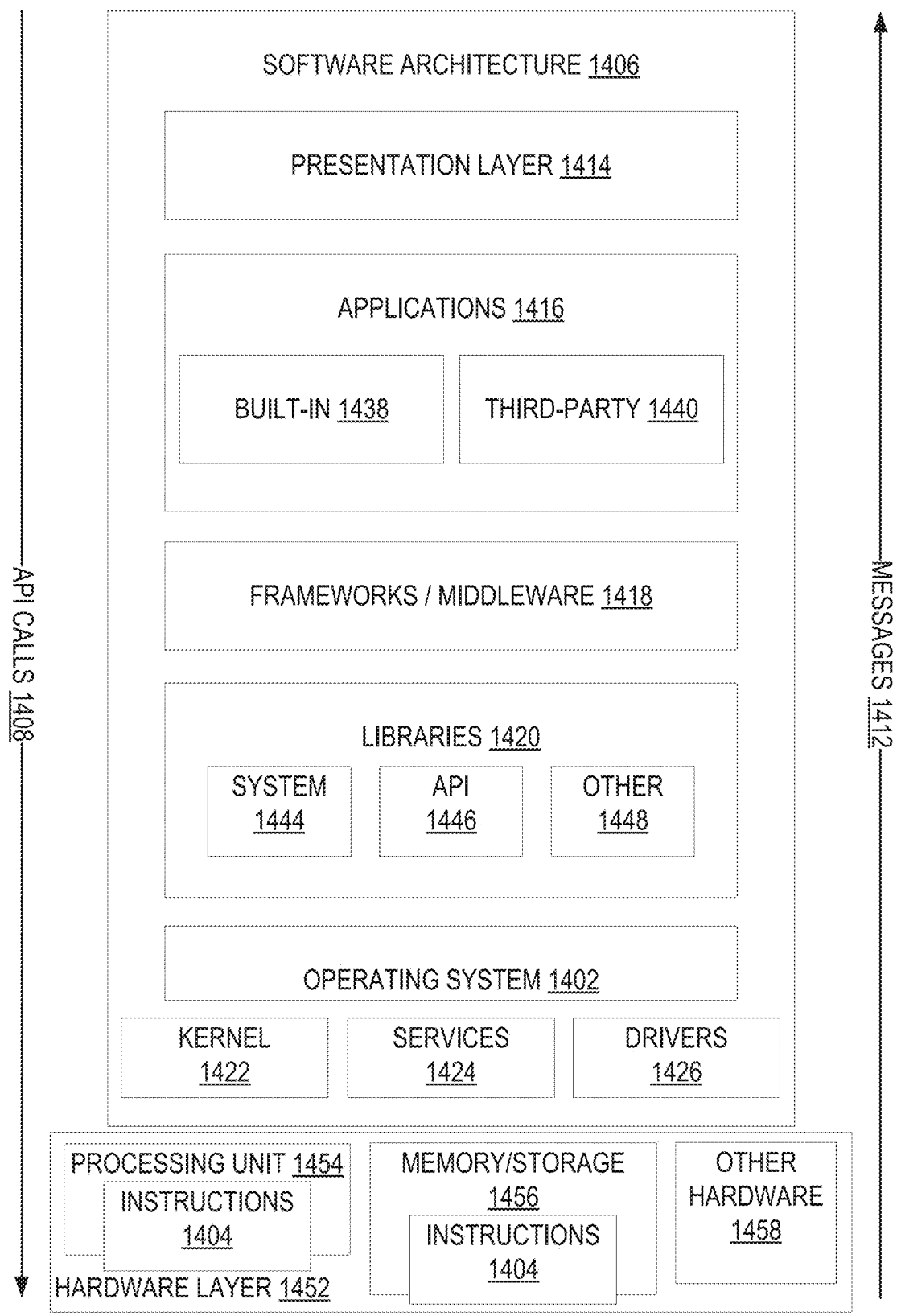
FIG. 14 is a block diagram illustrating a representative software architecture, which may be used in conjunction with various hardware architectures herein described and used to implement various embodiments.

FIG. 14 is a block diagram illustrating an example software architecture 1406, which may be used in conjunction with various hardware architectures herein described. FIG. 14 is a non-limiting example of a software architecture and it will be appreciated that many other architectures may be implemented to facilitate the functionality described herein. The software architecture 1406 may execute on hardware such as the machine 1500 of FIG. 15 that includes, among other things, processors 1504, memory 1514, and I/O components 1518. A representative hardware layer 1452 is illustrated and can represent, for example, the machine 1500 of FIG. 15. The representative hardware layer 1452 includes a processing unit 1454 having associated executable instructions 1404. Executable instructions 1404 represent the executable instructions of the software architecture 1406, including implementation of the methods, components and so forth described herein. The hardware layer 1452 also includes memory and/or storage modules memory/storage 1456, which also have executable instructions 1404. The hardware layer 1452 may also comprise other hardware 1458.

In the example architecture of FIG. 14, the software architecture 1406 may be conceptualized as a stack of layers where each layer provides particular functionality. For example, the software architecture 1406 may include layers such as an operating system 1402, libraries 1420, applications 1416 and a presentation layer 1414. Operationally, the applications 1416 and/or other components within the layers may invoke application programming interface (API) API calls 1408 through the software stack and receive messages 1412 in response to the API calls 1408. The layers illustrated are representative in nature and not all software architectures have all layers. For example, some mobile or special purpose operating systems may not provide a frameworks/middleware 1418, while others may provide such a layer. Other software architectures may include additional or different layers.

The operating system 1402 may manage hardware resources and provide common services. The operating system 1402 may include, for example, a kernel 1422, services 1424 and drivers 1426. The kernel 1422 may act as an abstraction layer between the hardware and the other software layers. For example, the kernel 1422 may be responsible for memory management, processor management (e.g., scheduling), component management, networking, security settings, and so on. The services 1424 may provide other common services for the other software layers. The drivers 1426 are responsible for controlling or interfacing with the underlying hardware. For instance, the drivers 1426 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1420 provide a common infrastructure that is used by the applications 1416 and/or other components and/or layers. The libraries 1420 provide functionality that allows other software components to perform tasks in an easier fashion than to interface directly with the underlying operating system 1402 functionality (e.g., kernel 1422, services 1424 and/or drivers 1426). The libraries 1420 may include system libraries 1444 (e.g., C standard library) that may provide functions such as memory allocation functions, string manipulation functions, mathematical functions, and the like. In addition, the libraries 1420 may include API libraries 1446 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1420 may also include a wide variety of other libraries 1448 to provide many other APIs to the applications 1416 and other software components/modules.

The frameworks/middleware 1418 (also sometimes referred to as middleware) provide a higher-level common infrastructure that may be used by the applications 1416 and/or other software components/modules. For example, the frameworks/middleware 1418 may provide various graphic user interface (GUI) functions, high-level resource management, high-level location services, and so forth. The frameworks/middleware 1418 may provide a broad spectrum of other APIs that may be utilized by the applications 1416 and/or other software components/modules, some of which may be specific to a particular operating system 1402 or platform.

The applications 1416 include built-in applications 1438 and/or third-party applications 1440. Examples of representative built-in applications 1438 may include, but are not limited to, a contacts application, a browser application, a book reader application, a location application, a media application, a messaging application, and/or a game application. Third-party applications 1440 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1440 may invoke the API calls 1408 provided by the mobile operating system (such as operating system 1402) to facilitate functionality described herein.

The applications 1416 may use built in operating system functions (e.g., kernel 1422, services 1424 and/or drivers 1426), libraries 1420, and frameworks/middleware 1418 to create user interfaces to interact with users of the system. Alternatively, or additionally, in some systems interactions with a user may occur through a presentation layer, such as presentation layer 1414. In these systems, the application/component "logic" can be separated from the aspects of the application/component that interact with a user.

Figure 15:
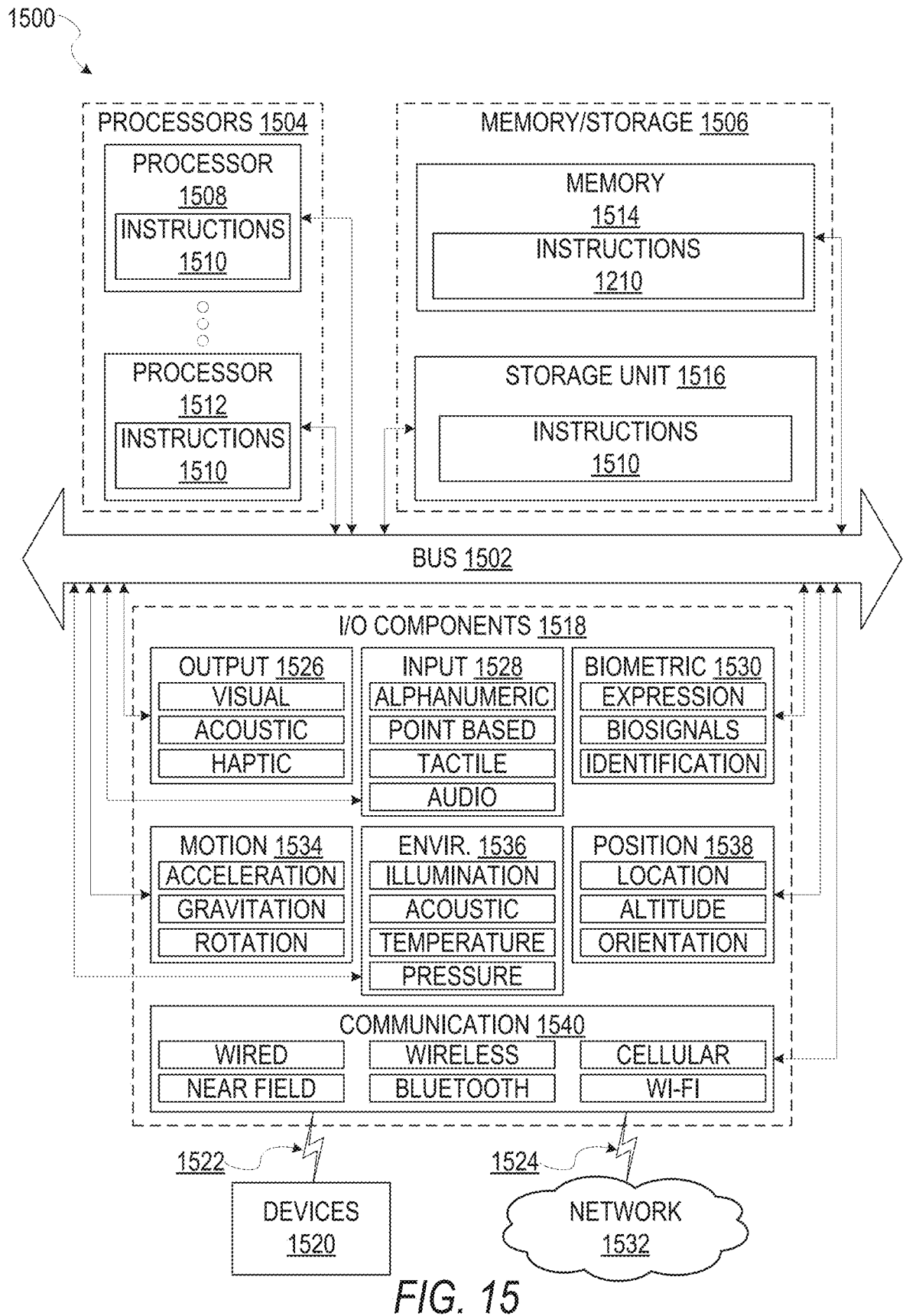
FIG. 15 is a block diagram illustrating components of a machine, according to some example embodiments, able to read instructions from a machine-readable medium (e.g., a machine-readable storage medium) and perform any one or more of the methodologies discussed herein.

FIG. 15 is a block diagram illustrating components of a machine 1500, according to some example embodiments, able to read instructions 1404 from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1510 (e.g., software, a program, an application, an applet, an app, or other executable code) for causing the machine 1500 to perform any one or more of the methodologies discussed herein may be executed. As such, the instructions 1510 may be used to implement modules or components described herein. The instructions 1510 transform the general, non-programmed machine 1500 into a particular machine 1500 programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1510, sequentially or otherwise, that specify actions to be taken by machine 1500. Further, while only a single machine 1500 is illustrated, the term "machine" shall also be taken to include a collection of machines that individually or jointly execute the instructions 1510 to perform any one or more of the methodologies discussed herein.

The machine 1500 may include processors 1504, memory memory/storage 1506, and I/O components 1518, which may be configured to communicate with each other such as via a bus 1502. The memory/storage 1506 may include a memory 1514, such as a main memory, or other memory storage, and a storage unit 1516, both accessible to the processors 1504 such as via the bus 1502. The storage unit 1516 and memory 1514 store the instructions 1510 embodying any one or more of the methodologies or functions described herein. The instructions 1510 may also reside, completely or partially, within the memory 1514, within the storage unit 1516, within at least one of the processors 1504 (e.g., within the processor's cache memory), or any suitable combination thereof, during execution thereof by the machine 1500. Accordingly, the memory 1514, the storage unit 1516, and the memory of processors 1504 are examples of machine-readable media.

The I/O components 1518 may include a wide variety of components to receive input, provide output, produce output, transmit information, exchange information, capture measurements, and so on. The specific I/O components 1518 that are included in a particular machine 1500 will depend on the type of machine. For example, portable machines such as mobile phones will likely include a touch input device or other such input mechanisms, while a headless server machine will likely not include such a touch input device. It will be appreciated that the I/O components 1518 may include many other components that are not shown in FIG. 15. The I/O components 1518 are grouped according to functionality merely for simplifying the following discussion and the grouping is in no way limiting. In various example embodiments, the I/O components 1518 may include output components 1526 and input components 1528. The output components 1526 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1528 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1518 may include biometric components 1530, motion components 1534, environmental environment components 1536, or position components 1538 among a wide array of other components. For example, the biometric components 1530 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1534 may include acceleration sensor components (e.g., accelerometer), gravitation sensor components, rotation sensor components (e.g., gyroscope), and so forth. The environment components 1536 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1538 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1518 may include communication components 1540 operable to couple the machine 1500 to a network 1532 or devices 1520 via coupling 1524 and coupling 1522 respectively. For example, the communication components 1540 may include a network interface component or other suitable device to interface with the network 1532. In further examples, communication components 1540 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1520 may be another machine or any of a wide variety of peripheral devices (e.g., a peripheral device coupled via a Universal Serial Bus (USB)).

Moreover, the communication components 1540 may detect identifiers or include components operable to detect identifiers. For example, the communication components 1540 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1540, such as, location via Internet Protocol (IP) geo-location, location via Wi-Fi® signal triangulation, location via detecting a NFC beacon signal that may indicate a particular location, and so forth.

Glossary

"CARRIER SIGNAL", in this context refers to, any intangible medium that is capable of storing, encoding, or carrying instructions 1510 for execution by the machine 1500, and includes digital or analog communications signals or other intangible medium to facilitate communication of such instructions 1510. Instructions 1510 may be transmitted or received over the network 1532 using a transmission medium via a network interface device and using any one of a number of well-known transfer protocols.

"CLIENT DEVICE", in this context, refers to any machine 1500 that interfaces to a communications network 1532 to obtain resources from one or more server systems or other client devices 102. A client device 102 may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network 1532.

"COMMUNICATIONS NETWORK", in this context, refers to one or more portions of a network 1532 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1532 or a portion of a network may include a wireless or cellular network and the coupling 1524 may be a Code Division Multiple Access (CDMA) connection, a Global System for Mobile communications (GSM) connection, or other type of cellular or wireless coupling. In this example, the coupling 1524 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE", in this context, refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM", in this context, refers to a component, device or other tangible media able to store instructions 1510 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database 120, or associated caches and servers) able to store instructions 1510. The term "machine-readable medium" shall also be taken to include any medium, or combination of multiple media, that is capable of storing instructions 1510 (e.g., code) for execution by a machine 1500, such that the instructions 1510, when executed by one or more processors 1504 of the machine 1500, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT", in this context, refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor 1508. Once configured by such software, hardware components become specific machines (or specific components of a machine) uniquely tailored to perform the configured functions and are no longer general-purpose processors 1508. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1508 configured by software to become a special-purpose processor, the general-purpose processor 1508 may be configured as respectively different special-purpose processors (e.g., comprising different hardware components) at different times. Software accordingly configures a particular processor 1508 or processors 1504, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1504 that are temporarily configured (e.g., by software) or permanently configured to perform the relevant operations. Whether temporarily or permanently configured, such processors 1504 may constitute processor-implemented components that operate to perform one or more operations or functions described herein. As used herein, "processor-implemented component" refers to a hardware component implemented using one or more processors 1504. Similarly, the methods described herein may be at least partially processor-implemented, with a particular processor or processors 1504 being an example of hardware. For example, at least some of the operations of a method may be performed by one or more processors 1504 or processor-implemented components. Moreover, the one or more processors 1504 may also operate to support performance of the relevant operations in a "cloud computing" environment or as a "software as a service" (SaaS). For example, at least some of the operations may be performed by a group of computers (as examples of machines 1500 including processors 1504), with these operations being accessible via a network 1532 (e.g., the Internet) and via one or more appropriate interfaces (e.g., an application program interface (API)). The performance of certain of the operations may be distributed among the processors 1504, not only residing within a single machine 1500, but deployed across a number of machines. In some example embodiments, the processors 1504 or processor-implemented components may be located in a single geographic location (e.g., within a home environment, an office environment, or a server farm). In other example embodiments, the processors 1504 or processor-implemented components may be distributed across a number of geographic locations.

"PROCESSOR", in this context, refers to any circuit or virtual circuit (a physical circuit emulated by logic executing on an actual processor 1508) that manipulates data values according to control signals (e.g., "commands", "op codes", "machine code", etc.) and which produces corresponding output signals that are applied to operate a machine 1500. A processor 1508 may, for example, be a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC) or any combination thereof. A processor 1508 may further be a multi-core processor having two or more independent processors (sometimes referred to as "cores") that may execute instructions contemporaneously.

"TIMESTAMP", in this context, refers to a sequence of characters or encoded information identifying when a certain event occurred, for example giving date and time of day, sometimes accurate to a small fraction of a second.

What is claimed is:

1. A method comprising:
accessing, using one or more processors of a device, a computer animation model, the computer animation model comprising a plurality of motion states;
generating a video output on a display of the device using the computer animation model;
detecting audio data from a microphone of the device;
determining a set of audio characteristics for the audio data received at the microphone of the device, the set of audio characteristics comprising a tempo value;
selecting a first motion state from the plurality of motion states;
generating one or more motion values of the first motion state using the set of audio characteristics;
selecting a motion pattern speed for a first control point of the computer animation model to match a first harmonic of the tempo value;
updating the video output using the one or more motion values with the computer animation model to create an animated action within the video output;
periodically randomly selecting a new motion state from the plurality of motion states;
generating one or more new motion values of the new motion state using the set of audio characteristics; and
updating the video using the one or more new motion values with the new motion state to change the animated action within the video.

2. The method of claim 1 further comprising updating the set of audio characteristics over time in response to changes in the audio data; and
updating the one or more motion values in response to changes in the set of audio characteristics over time.

3. The method of claim 2 wherein the computer animation model is associated with one or more audio animation criteria used to initiate the animated action within the video.

4. The method of claim 3 further comprising:
comparing the set of audio characteristics with the one or more audio animation criteria; and
selecting a default state for the computer animation model when the set of audio characteristics does not meet the one or more audio animation criteria, wherein the plurality of motion states does not include the default state.

5. The method of claim 1 wherein the set of audio characteristics comprises an audio energy value; and
wherein the first motion state is randomly selected from a subset of the plurality of motion states based on the audio energy value, wherein the subset of the plurality of motion states comprise an audio energy match characteristic associated with the audio energy value.

6. The method of claim 5 wherein the set of audio characteristics further comprises a beat value, a tempo value, a melody value, and a danceability value.

7. The method of claim 6 wherein the audio energy value and the danceability value are based on a beat consistency over time value and a fundamental frequency value associated with a melody of the audio data.

8. The method of claim 1 wherein the computer animation model is associated with N, wherein N comprises the plurality of motion states;
wherein $$N=(B \times C)^A$$

such that A comprises control points, B comprises motion patterns, and C comprises tempo harmonics.

9. The method of claim 8, wherein each motion state $M_N$ of the plurality of motion states is assigned a corresponding probability such that a probability mass function P( ) of the probability value assigned to said each motion state is:

$$P(M_1, M_2, M_3 \ldots M_{N-1}, M_N)=1; \text{ and}$$

wherein selecting the first motion state from the plurality of motion states is based on a corresponding probability value $P(M_1)$ for the first motion state.

10. A device comprising:
a memory comprising a computer animation model, the computer animation model comprising a plurality of motion states; and
one or more processors coupled to the memory and configured to perform operations comprising:
generating a video output on a display of the device using the computer animation model;
detecting audio data from a microphone of the device;
determining a set of audio characteristics for the audio data received at the microphone of the device, the set of audio characteristics comprising a tempo value;
randomly selecting a first motion state from the plurality of motion states;
generating one or more motion values of the first motion state using the set of audio characteristics;
selecting a motion pattern speed for a first control point of the computer animation model to match a first harmonic of the tempo value;
updating the video output using the one or more motion values with the computer animation model to create an animated action within the video output;
periodically randomly selecting a new motion state from the plurality of motion states;
generating one or more new motion values of the new motion state using the set of audio characteristics; and
updating the video using the one or more new motion values with the new motion state to change the animated action within the video.

11. The device of claim 10 further comprising updating the set of audio characteristics over time in response to changes in the audio data; and
updating the one or more motion values in response to changes in the set of audio characteristics over time.

12. The device of claim 10 wherein the computer animation model is associated with one or more audio animation criteria used to initiate the animated action within the video; and
wherein the one or more processors are further configured to perform operations comprising:
comparing the set of audio characteristics with the one or more audio animation criteria; and
selecting a default state for the computer animation model when the set of audio characteristics does not meet the one or more audio animation criteria, wherein the plurality of motion states does not include the default state.

13. A non-transitory computer readable medium comprising instructions that, when executed by processing circuitry of a device, cause the device to perform operations of a method comprising:
accessing a computer animation model, the computer animation model comprising a plurality of motion states;
generating a video output on a display of the device using the computer animation model;

detecting audio data from a microphone of the device;
determining a set of audio characteristics for the audio data received at the microphone of the device, the set of audio characteristics comprising a tempo value;
selecting a first motion state from the plurality of motion states;
generating one or more motion values of the first motion state using the set of audio characteristics;
selecting a motion pattern speed for a first control point of the computer animation model to match a first harmonic of the tempo value;
updating the video output using the one or more motion values with the computer animation model to create an animated action within the video output;
periodically randomly selecting a new motion state from the plurality of motion states;
generating one or more new motion values of the new motion state using the set of audio characteristics; and
updating the video using the one or more new motion values with the new motion state to change the animated action within the video.

14. The non-transitory medium of claim 13 wherein the set of audio characteristics comprises a tempo value;
wherein the set of audio characteristics comprises an audio energy value;
wherein the first motion state is randomly selected from a subset of the plurality of motion states based on the audio energy value, wherein the subset of the plurality of motion states comprise an audio energy match characteristic associated with the audio energy value; and
wherein the set of audio characteristics further comprises a beat value, a tempo value, a melody value, and a danceability value.

15. The non-transitory medium of claim 14, further comprising:
selecting the first motion state from a subset of the plurality of motion states based on the audio energy value, wherein the subset of the plurality of motion states comprises an audio energy match characteristic associated with an audio energy value,
wherein the set of audio characteristics further comprises a beat value, a tempo value, a melody value, and a danceability value.

16. The non-transitory medium of claim 15, wherein the audio energy value and the danceability value are based on a beat consistency over time value and a fundamental frequency value associated with a melody of the audio data.

17. The non-transitory medium of claim 13, wherein the computer animation model is associated with one or more audio animation criteria used to initiate the animated action within the video.

18. The non-transitory medium of claim 13, further comprising:
comparing the set of audio characteristics with the one or more audio animation criteria; and
selecting a default state for the computer animation model when the set of audio characteristics does not meet the one or more audio animation criteria, wherein the plurality of motion states does not include the default state.

19. The non-transitory medium of claim 13, wherein the computer animation model is associated with N, wherein N comprises the plurality of motion states;
wherein $$N=(B \times C)^A$$

A comprises control points, B comprises motion patterns, and C comprises tempo harmonics.

20. The non-transitory medium claim 19, wherein each motion state $M_N$ of the plurality of motion states is assigned a corresponding probability such that a probability mass function P( ) of the probability value assigned to said each motion state is:

$$P(M_1, M_2, M_3 \ldots M_{N-1}, M_N)=1; \text{ and}$$

wherein randomly selecting the first motion state from the plurality of motion states is based on a corresponding probability value $P(M_1)$ for the first motion state.

* * * * *